US010791730B2

(12) United States Patent
Gosiewska et al.

(10) Patent No.: US 10,791,730 B2
(45) Date of Patent: Oct. 6, 2020

(54) COMPOSITION AND METHODS FOR CRYOPRESERVATION OF HUTC

(71) Applicant: DePuy Synthes Products, Inc., Raynham, MA (US)

(72) Inventors: Anna Gosiewska, Skillman, NJ (US); Anthony J. Kihm, Princeton, NJ (US)

(73) Assignee: DEPUY SYNTHES PRODUCTS, INC., Raynham, MA (US)

( * ) Notice: Subject to any disclaimer, the term of this patent is extended or adjusted under 35 U.S.C. 154(b) by 82 days.

(21) Appl. No.: 15/400,022

(22) Filed: Jan. 6, 2017

(65) Prior Publication Data
US 2017/0202212 A1 Jul. 20, 2017

Related U.S. Application Data

(60) Provisional application No. 62/278,780, filed on Jan. 14, 2016.

(51) Int. Cl.
A01N 1/02 (2006.01)
(52) U.S. Cl.
CPC ......... *A01N 1/0226* (2013.01); *A01N 1/0221* (2013.01)
(58) Field of Classification Search
CPC .......................... C12N 5/0605; A01N 1/0226
See application file for complete search history.

(56) References Cited

U.S. PATENT DOCUMENTS

| | | | |
|---|---|---|---|
| 4,205,399 A | 6/1980 | Shalaby et al. | |
| 4,938,961 A * | 7/1990 | Collins | A01N 1/02 424/606 |
| 6,013,067 A | 1/2000 | Fibbe et al. | |
| 6,485,959 B1 * | 11/2002 | Demetriou | A01N 1/02 435/243 |
| 6,488,702 B1 | 12/2002 | Besselink | |
| 6,800,480 B1 | 10/2004 | Bodnar et al. | |
| 7,297,539 B2 | 11/2007 | Mandalam et al. | |
| 7,410,798 B2 | 8/2008 | Mandalam et al. | |
| 7,413,734 B2 | 8/2008 | Mistry et al. | |
| 7,510,873 B2 | 3/2009 | Mistry et al. | |
| 7,524,489 B2 | 4/2009 | Messina et al. | |
| 7,560,276 B2 | 7/2009 | Harmon et al. | |
| 2003/0096402 A1 | 5/2003 | Lee et al. | |
| 2003/0175956 A1 | 9/2003 | Bodnar et al. | |
| 2004/0151709 A1 | 8/2004 | Barrueta et al. | |
| 2004/0235159 A1 | 11/2004 | Mandalam et al. | |
| 2005/0019865 A1 | 1/2005 | Kihm et al. | |
| 2005/0032209 A1 | 2/2005 | Messina et al. | |
| 2005/0037491 A1 | 2/2005 | Mistry et al. | |
| 2005/0037492 A1 | 2/2005 | Xu et al. | |
| 2005/0054098 A1 | 3/2005 | Mistry et al. | |
| 2005/0058629 A1 | 3/2005 | Harmon et al. | |
| 2006/0094113 A1 | 5/2006 | Epstein et al. | |
| 2006/0153817 A1 | 7/2006 | Kihm et al. | |
| 2006/0153818 A1 | 7/2006 | Dhanaraj et al. | |
| 2006/0154366 A1 | 7/2006 | Brown et al. | |
| 2006/0154367 A1 | 7/2006 | Kihm et al. | |
| 2007/0190034 A1 * | 8/2007 | Paludan | A61K 35/50 424/93.7 |
| 2008/0020458 A9 | 1/2008 | Mandalam et al. | |
| 2008/0166328 A1 | 7/2008 | Harmon et al. | |
| 2009/0311735 A1 | 12/2009 | Crook et al. | |
| 2010/0143289 A1 | 6/2010 | Cohen | |
| 2011/0212489 A1 | 9/2011 | Gadellaa et al. | |
| 2012/0014921 A1 | 1/2012 | Kramer et al. | |
| 2012/0128641 A1 * | 5/2012 | Austen, Jr. | A01N 1/0221 424/93.7 |
| 2014/0170748 A1 | 6/2014 | Bhatia et al. | |

FOREIGN PATENT DOCUMENTS

| | | |
|---|---|---|
| EP | 2 039 758 B1 | 9/2010 |
| EP | 2 267 116 A1 | 12/2010 |
| WO | 1991/10726 A1 | 7/1991 |
| WO | 2005/001077 A2 | 1/2005 |
| WO | 2005/001078 A2 | 1/2005 |
| WO | 2005/001079 A2 | 1/2005 |
| WO | 2005/003334 A2 | 1/2005 |
| WO | 2005/038012 A2 | 4/2005 |
| WO | 2009/092789 A1 | 7/2009 |
| WO | 2009/147200 A2 | 12/2009 |
| WO | 2011011055 A2 | 1/2011 |
| WO | 2011/101834 A1 | 8/2011 |
| WO | 2014/093598 A1 | 6/2014 |
| WO | 2015175457 A1 | 11/2015 |
| WO | 2017/123465 A1 | 7/2017 |

OTHER PUBLICATIONS

DNR Molecular Biology, "Product Profile: Minimum Essential Medium" Dec. 31, 2009, accessible online <http://www.dnr-IS.com/src124 Minimum Essential Medium.pdf>.
Dulbecco's Modified Eagle's Medium (DME) Base, Sigma-Aldrich Product No. D5030 (Apr. 2007).
Dulbecco's Modified Eagle's Medium (DMEM) Formulation, Catalog No. 30-2002, American Tissue Culture Collection (2002).
Fenselau, A. et al., "Nucleoside requirements for the in vitro growth of bovine aortic endothelial cells." J Cell Physiol., 1981; 108(3):375-84.
Fu, X. et al., "Studies on the Permeability of PVC/EBBA Overlapped Ultrathin Composite Membranes Modified by Plasma—Polymerization with Fluorocarbon Monomers," Chinese Journal of Polymer Science, 1989; 7:124-131.
International Search Report and Written Opinion dated Mar. 14, 2017 from PCT/US2017/012491 (10 pages).
Minimum Essential Medium Eagle (MEM) (Alpha Modification) with L-Glutamine, Deoxyribonucleosides and Ribonucleosides Without Sodium Bicarbonate, Product code: AT080, HiMedia Laboratories (Revision Jan. 2011).
Ozturk, S. S., "Engineering challenges in high density cell culture systems," Cytotechnology, 1996; 22: 3-16.

(Continued)

*Primary Examiner* — Ruth A Davis

(57) ABSTRACT

This invention provides for compositions for cryopreservation of human umbilical cord tissue-derived cells. The cryopreservation compositions may comprise: (a) amino acids; (b) vitamins; (c) inorganic salts; and (d) DMSO, sucrose, mannitol, and lactobionic acid. The invention also provides for kits comprising the composition and human umbilical cord tissue-derived cells and methods of cryopreserving the cells, which utilize the compositions.

11 Claims, 6 Drawing Sheets

(56) References Cited

OTHER PUBLICATIONS

Park, B-G et al., "Development of high density mammalian cell culture system for the production of tissue-type plasminogen activator," Biotechnology and Bioprocess Engineering, 2000; 5:123-129.
Saez-Lara, M.J. et al., "Exogenous nucleosides stimulate proliferation of fetal rat hepatocytes," Journal of Nutrition, 2004; 134(6):1309-13.
Santos, Fd et al., "Toward a clinical-grade expansion of mesenchymal stem cells from human sources: a microcarrier-based culture system under xeno-free conditions." Tissue Eng Part C Methods.; 17(12):1201-1 (2011).
Stemcell Technologies, "Minimum essential Medium Eagle Alpha Modification with Nucleosides," Catalog #36450, Version 1.1.0, Apr. 1, 2008, available online at <http://www.stemcell.com/~/media/TechnicalResources/0/9/A/1/0/29846_PIS_1_1_0.pdf?la=en>.
Balci, D. and Can, A., "The assessment of cryopreservation conditions for human umbilical cord stroma-derived mesenchymal stem cells towards a potential use for stem cell banking," Current Stem Cell Research & Therapy, 2013, 8, 60-72.
Corning® DMEM (Dulbecco's Modified Eagle's Medium)/Hams F-12 50150 Mix Product Facts, dated Jul. 2015.
Dulbecco's Modified Eagle Medium/Nutrient Mixture F-12 Ham (DMEM/F12, 1:1 mixture), Product Information for Product Code AT216, Revision 0/2005.

\* cited by examiner

COMPOSITION AND METHODS FOR CRYOPRESERVATION OF HUTC

CROSS-REFERENCE TO RELATED APPLICATIONS

This application claims priority to U. S. Provisional Application 62/278,780 (filed on Jan. 14, 2016), the contents of which is incorporated by reference in its entirety.

FIELD OF THE INVENTION

This application relates to compositions useful for the cryopreservation of human umbilical cord tissue-derived cells (hUTC) and methods of cryopreserving hUTC utilizing these compositions.

BACKGROUND OF THE INVENTION

For an allogeneic cell therapy product, cells or tissues are obtained from a donor, which are further manipulated before administering to patients. A manufacturing process for a non-homologous cell therapy product typically includes the steps of: thawing and expansion of cells; concentration of the cells and removal of undesirable impurities such as serum and trypsin used during production of cells; constituting the cells into a final formulation buffer; and cryopreservation of the cells or product. Once at a clinical site, the cryopreserved product is thawed and administered to a recipient. The product remains in the cryopreservation formulation before and during the administering to a recipient.

Cryopreservation is a process for preserving cells or whole tissue by cooling to sub-zero temperatures. At these cold temperatures, any biological activity, including the biochemical reactions that would cause cell death, is effectively stopped. However, cryopreservation is known to cause damage to frozen cells and thus affects cell survival. The cell survivability during the cryopreservation is measured by cell recovery and viability after thaw. Cell survival during the cryopreservation can be significantly affected by process variables such as e.g. cryopreservation formulation, freezing cycle and procedure, and thawing procedure. In addition, phenomena, which can cause damage to cells during cryopreservation, mainly occur during the freezing stage, and include but are not limited to solution effects, extracellular ice formation, dehydration, and intracellular ice formation. To avoid this damage, cryoprotectant solutions, which are uniquely designed for the cell to be preserved, are used. The use of such cryoprotectants, protects the cells from damage due to freezing during the cooling or thawing process.

Therefore, it is important that the final cryopreservation formulation, which is also used as a vehicle to deliver the product, be able to support and to maintain high cell survivability and preserve the product integrity during thaw. The formulation also needs to be safe to administer to a recipient. Furthermore, the cryopreservation formulation should support product stability over a long period.

What is needed is a composition useful for cryopreservation of human umbilical cord tissue-derived cells that maintains the functionality and therapeutic usefulness.

SUMMARY OF THE INVENTION

One embodiment of the invention is a composition suitable for cryopreservation of umbilical cord tissue-derived cells comprising: (1) the amino acids L-Arginine, L-Glutamine, Glycine, L-Isoleucine, L-Leucine, L-Lysine, HCl, L-Methionine, L-Phenylalanine, L-Serine, L-Threonine, L-Tryptophan and L-Valine; (2) the vitamins D-calcium pantothenate, choline chloride, folic acid, niacinamide, pyridoxine, HCl, riboflavin and thiamine, HCl; (3) the inorganic salts potassium chloride, USP, sodium bicarbonate, USP, sodium chloride, USP and sodium phosphate, monobasic, $H_2O$; and (4) DMSO, dextrose, anhydrous, USP, sucrose and mannitol.

In certain embodiments, the composition comprises: (1) from about 37.8 to about 75.6 mg/L of L-Arginine, from about 262.8 to about 525.6 mg/L of L-Glutamine, from about 13.5 to about 27 mg/L of L-Glycine, from about 47.16 to about 94.32 mg/L of L-Isoleucine, from about 47.16 to about 94.32 mg/L of L-Leucine, from about 65.79 to about 131.58 mg/L of L-Lysine, HCl, from about 13.5 to about 27 mg/L of L-Methionine, from about 29.7 to about 59.4 mg/L of L-Phenylalanine, from about 18.9 to about 37.8 mg/L of L-Serine, from about 42.75 to about 85.5 mg/L of L-Threonine, from about 7.2 to about 14.4 mg/L of L-Tryptophan and from about 41.85 to about 83.7 mg/L of L-Valine; (2) from about 0.18 to about 0.36 mg/L of riboflavin and from about 1.8 to about 3.6 mg/L of each of the vitamins, D-calcium pantothenate, choline chloride, folic acid, niacinamide, pyridoxine, HCl and thiamine; (3) from about 360 to about 432 mg/L of potassium chloride, USP, from about 2565 to about 3330 mg/L of sodium bicarbonate, USP, from about 2880 to about 5760 mg/L of sodium chloride, USP and from about 56.25 to about 112.5 mg/L of sodium phosphate, monobasic, $H_2O$; and from about 5 to about 10% of DMSO, from about 855 mg/L to about 900 mg/L of dextrose, from about 3081 to about 6160 mg/L of sucrose and from about 1639 to about 3240 mg/L of mannitol.

The composition further may further comprise lactobionic acid, glutathione and the inorganic salts calcium chloride dihydrate ($CaCl_2.2H_2O$), magnesium chloride ($MgCl_2.6H_2O$), potassium bicarbonate ($KHCO_3$), and potassium monophosphate ($KH_2PO_4$). Thus, in one embodiment, the composition comprises: (1) at least about 37.8 mg/L of L-Arginine, at least about 262.8 mg/L of L-Glutamine, at least about 13.5 mg/L of L-Glycine, at least about 47.16 mg/L of L-Isoleucine, at least about 47.16 mg/L of L-Leucine, at least about 65.79 mg/L of L-Lysine, HCl, at least about 13.5 mg/L of L-Methionine, at least about 29.7 mg/L of L-Phenylalanine, at least about 18.9 mg/L of L-Serine, at least about 42.75 5 mg/L of L-Threonine, at least about 7.2 mg/L of L-Tryptophan and 41.85 mg/L of L-Valine; (2) at least about 0.18 mg/L of riboflavin and at least about 1.8 mg/L of each of the vitamins, D-calcium pantothenate, choline chloride, folic acid, niacinamide, pyridoxine, HCl and thiamine; (3) at least about 432 mg/L of potassium chloride, USP, about 2565 mg/L of sodium bicarbonate, USP, about 2880 of sodium chloride, USP, at least about 56.25 mg/L of sodium phosphate, monobasic, $H_2O$, at least about 3.2 mg/L of calcium chloride dihydrate ($CaCl_2.2H_2O$), at least about 458 mg/L of magnesium chloride ($MgCl_2.6H_2O$), at least about 225 mg/L of potassium bicarbonate ($KHCO_3$), and at least about 612 mg/L of potassium monophosphate ($KH_2PO_4$), and (4) from about 5 to about 10% v/v of DMSO, at least about 855 mg/L of dextrose, anhydrous, USP, at least about 415 mg/L of glutathione; at least about 3081 mg/L sucrose and at least about 1639 mg/L of mannitol.

In another embodiment, the composition does not include lactobionic acid, glutathione and the inorganic salts calcium chloride dihydrate ($CaCl_2.2H_2O$), magnesium chloride ($MgCl_2.6H_2O$), potassium bicarbonate ($KHCO_3$), and potassium monophosphate ($KH_2PO_4$). In this embodiment, the composition comprises: (1) at least about 75.6 mg/L of L-Arginine, at least about 525.6 mg/L of L-glutamine, at least about 27 mg/L of L-glycine, at least about 94.32 mg/L of L-isoleucine, at least about 94.32 mg/L of L-leucine, at least about 131.58 mg/L of L-lysine, HCl, at least about 27 mg/L of L-methionine, at least about 59.4 mg/L of L-phenylalanine, at least about 37.8 mg/L of L-serine, at least about 85.5 mg/L of L-threonine, 14.4 mg/L of L-tryptophan and at least about 83.7 mg/L of L-valine; (2) at least about 0.36 mg/L of riboflavin and at least about 3.6 mg/L of each of the vitamins, D-calcium pantothenate, choline chloride, folic acid, niacinamide, pyridoxine, HCl and thiamine; (3) at least about 360 mg/L of potassium chloride, USP, at least about 3330 mg/L of sodium bicarbonate, USP, at least about 5760 mg/L of sodium chloride, USP and at least about 112.5 mg/L of sodium phosphate, monobasic, $H_2O$; and (4) from about 5 to about 10% v/v of DMSO, at least about 900 mg/L of dextrose, anhydrous, USP, at least about 6160 mg/L of sucrose and at least about 3240 mg/L of mannitol.

The compositions may be used in kits comprising umbilical cord tissue-derived cells and in methods of cryopreserving human umbilical cord tissue-derived cells.

In one embodiment, the umbilical cord tissue-derived cells are isolated from human umbilical cord tissue substantially free of blood, are capable of self-renewal and expansion in culture, have the potential to differentiate, lack the production of CD117 or CD45, and do not express hTERT or telomerase. In another embodiment, the umbilical cord tissue-derived cells further comprise one or more of the following characteristics: express oxidized low density lipoprotein receptor 1, reticulon, chemokine receptor ligand 3, and/or granulocyte chemotactic protein; do not express CD31 or CD34; express, relative to a human fibroblast, mesenchymal stem cell, or iliac crest bone marrow cell, increased levels of interleukin 8 or reticulon 1; and express CD10, CD13, CD44, CD73, and CD90.

Another embodiment of the invention is a method of cryopreserving human umbilical cord tissue-derived cells comprising the sequential steps of: providing a cryopreservation composition comprising umbilical cord tissue-derived cells and a formulation; cooling the cryopreservation composition from a starting temperature of about 4° C. at a rate of −1.0° C./min until the composition achieves a temperature of about −45.0° C.; and further cooling the cryopreservation composition until the composition achieves a storage temperature of about −120.0° C. Optionally, the method further comprises cooling the cryopreservation composition to a starting temperature of about 4° C. and/or maintaining the starting temperature of about 4° C. for about 15 minutes.

Other features and advantages of the invention will be apparent from the detailed description that follows.

BRIEF DESCRIPTION OF THE DRAWINGS

The foregoing summary, as well as the following detailed description of the invention, will be better understood when read in conjunction with the appended figures. For the purpose of illustrating the invention, the figures demonstrate embodiments of the present invention. It should be understood, however, that the invention is not limited to the precise arrangements, examples, and instrumentalities shown.

FIG. 5 shows a control rat on the left and a rat treated with a formulation containing CS10 on the right with edema and redness in the paws (see Example 2).

FIG. 6 shows the results for the samples outlined in Table 3-1. FIG. 6A shows the results for samples A to E. FIG. 6B shows the results for samples A and F to I.

DETAILED DESCRIPTION

Figure 1:
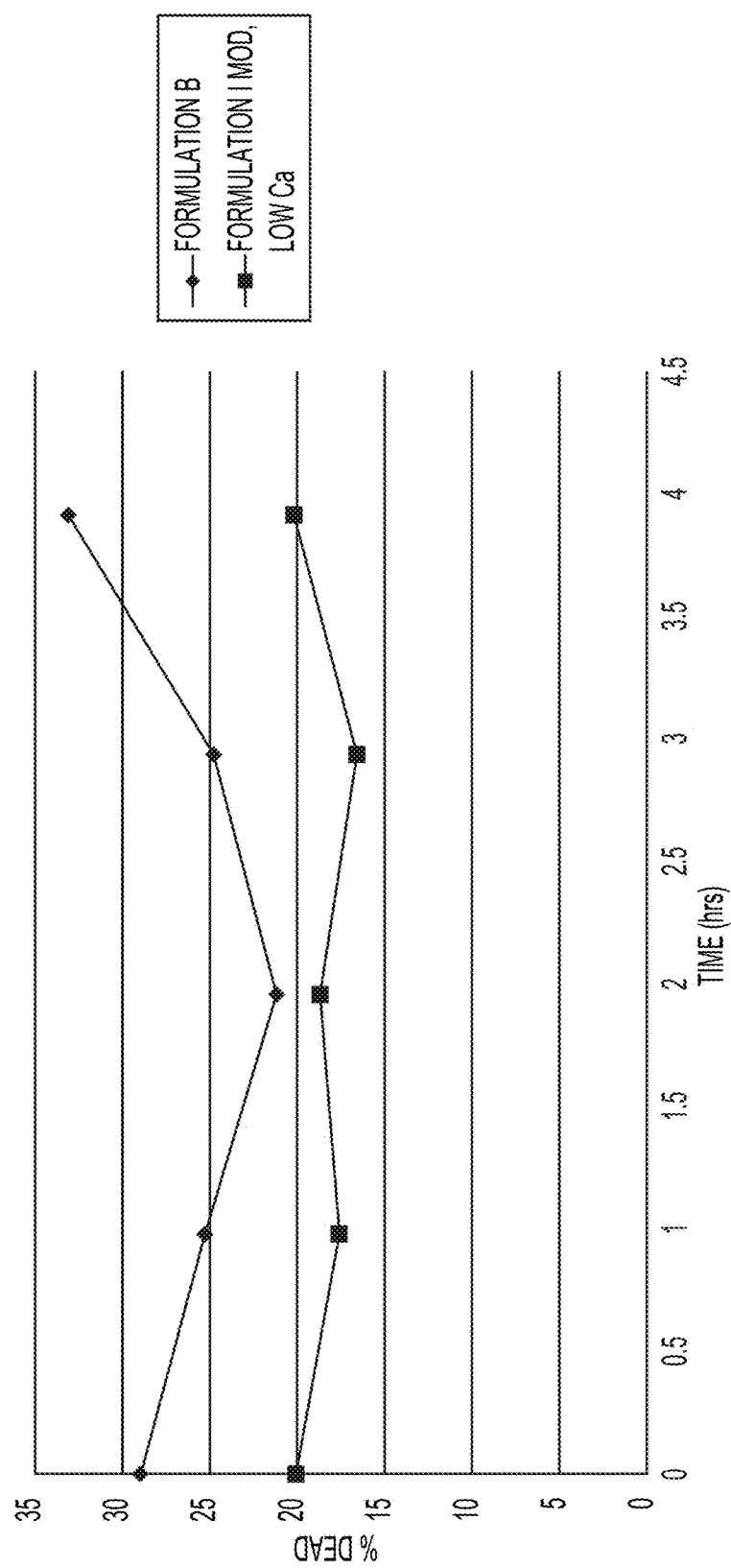
FIG. 1 shows cell survivability at room temperature after thaw.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense.

This invention discloses compositions of cryopreservation and freezing profiles that can be used to cryopreserve human umbilical tissue cells (hUTC). Furthermore, this invention discloses a composition of cryopreservation formulation to freeze a cell therapy product derived from hUTC. The disclosed formulation/compositions(s) are: safe to administer based on the animal studies; maintain high cell viability after thaw; and maintain high cell survival during cryopreservation. These compositions optimally: (a) maintain iconic and osmotic balance and acidosis; (b) prevent cellular swelling; and (c) control free radical accumulation.

This invention describes formulations to cryopreserve an allogeneic cell therapy hUTC. These cryopreservation formulations maintain high hUTC survival during the cryopreservation step. Furthermore, the formulations used as a vehicle to deliver the product do not exhibit any adverse effect based on animal models. In addition, the cryopreservation formulations maintain the integrity of the thawed product (i.e. the hUTC) for a short period of time so that the formulations are suitable for administration into a patient.

Most cryopreservation formulations contain dimethylsulfoxide (DMSO) ranging from 5% to 10% (v/v) to maintain osmotic balance between the intra- and extracellular environment. DMSO also inhibits intracellular ice formation during cryopreservation. Other chemicals such as glycerol, ethylene glycol, dextran and hydroxycellulose, or the disaccharides sucrose, maltose, and trehalose, enhance cell viability when combined with DMSO. The cryopreservation compositions disclosed in this application contain a unique balanced mixture of DMSO, mannitol, sucrose, and lactobionic acid to maintain osmotic balance during freezing. In addition, the composition contains amino acids, vitamins, and trace metals to supply nutrients to the cells.

In one embodiment, the invention discloses a cryopreservation formulation/composition which maintains high survivability of hUTC and is well-tolerated following IV administration at a dose volume up to approximately 10 mL/kg and following injection into the CSF at a volume of 100 μL which is approximately 25-33% of the total CSF volume of the rat (between 300-400 μL).

Various terms are used throughout the specification and claims. Such terms are to be given their ordinary meaning in the art unless otherwise indicated. Other specifically defined terms are to be construed in a manner consistent with the definition provided herein.

In one embodiment, the cells used in the present invention are generally referred to as postpartum cells or postpartum-derived cells (PPDCs). These cells are more specifically "umbilicus-derived cells" or "umbilical cord-derived cells" (UDC), or "umbilical cord tissue-derived cells" (UTC) or "human umbilical cord tissue-derived cells" (hUTC). In addition, the cells may be described as being stem or progenitor cells, the latter term being used in the broad sense. The term "derived" is used to indicate that the cells have been obtained from their biological source and grown or otherwise manipulated in vitro (e.g., cultured in a growth medium to expand the population and/or to produce a cell line). The in vitro manipulations of umbilical stem cells and the unique features of the umbilicus-derived cells of the present invention are described in detail below.

Stem cells are undifferentiated cells defined by the ability of a single cell both to self-renew and to differentiate to produce progeny cells, including self-renewing progenitors, non-renewing progenitors, and terminally differentiated cells. Stem cells are also characterized by their ability to differentiate in vitro into functional cells of various cell lineages from multiple germ layers (endoderm, mesoderm and ectoderm), as well as to give rise to tissues of multiple germ layers following transplantation, and to contribute substantially to most, if not all, tissues following injection into blastocysts.

Stem cells are classified according to their developmental potential as: (1) totipotent; (2) pluripotent; (3) multipotent; (4) oligopotent; and (5) unipotent. Totipotent cells are able to give rise to all embryonic and extraembryonic cell types. Pluripotent cells are able to give rise to all embryonic cell types. Multipotent cells include those able to give rise to a subset of cell lineages, but all within a particular tissue, organ, or physiological system. For example, hematopoietic stem cells (HSC) can produce progeny that include HSC (self-renewal), blood cell-restricted oligopotent progenitors, and all cell types and elements (e.g., platelets) that are normal components of the blood. Cells that are oligopotent can give rise to a more restricted subset of cell lineages than multipotent stem cells. Cells, which are unipotent, are able to give rise to a single cell lineage (e.g., spermatogenic stem cells).

Stem cells are also categorized based on the source from which they are obtained. An adult stem cell is generally a multipotent undifferentiated cell found in tissue comprising multiple differentiated cell types. The adult stem cell can renew itself. Under normal circumstances, it can also differentiate to yield the specialized cell types of the tissue from which it originated, and possibly other tissue types. An embryonic stem cell is a pluripotent cell from the inner cell mass of a blastocyst-stage embryo. A fetal stem cell is one that originates from fetal tissues or membranes. A postpartum stem cell is a multipotent or pluripotent cell that originates substantially from extraembryonic tissue available after birth, namely, the umbilical cord. These cells have been found to possess features characteristic of pluripotent stem cells, including rapid proliferation and the potential for differentiation into many cell lineages. Postpartum stem cells may be blood-derived (e.g., as are those obtained from umbilical cord blood) or non-blood-derived (e.g., as obtained from the non-blood tissues of the umbilical cord and placenta).

Various terms are used to describe cells in culture. "Cell culture" refers generally to cells taken from a living organism and grown under controlled conditions ("in culture" or "cultured"). A "primary cell culture" is a culture of cells, tissues, or organs taken directly from an organism(s) before the first subculture. Cells are "expanded" in culture when they are placed in a growth medium under conditions that facilitate cell growth and/or division, resulting in a larger population of the cells. When cells are expanded in culture, the rate of cell proliferation is sometimes measured by the amount of time needed for the cells to double in number. This is referred to as "doubling time."

The term "cell line" generally refers to a population of cells formed by one or more subcultivations of a primary cell culture. Each round of subculturing is referred to as a passage. When cells are subcultured, they are referred to as having been "passaged." A specific population of cells, or a cell line, is sometimes referred to or characterized by the number of times it has been passaged. For example, a cultured cell population that has been passaged ten times may be referred to as a P10 culture. The primary culture, i.e., the first culture following the isolation of cells from tissue, is designated P0. Following the first subculture, the cells are described as a secondary culture (P1 or passage 1). After the second subculture, the cells become a tertiary culture (P2 or passage 2), and so on. It will be understood by those of skill in the art that there may be many population doublings during the period of passaging; therefore, the number of population doublings of a culture is greater than the passage number. The expansion of cells (i.e., the number of population doublings) during the period between passaging depends on many factors, including, but not limited to, the seeding density, substrate, medium, growth conditions, and time between passaging.

"Differentiation" is the process by which an unspecialized ("uncommitted") or less specialized cell acquires the features of a specialized cell, such as e.g. a nerve cell or a muscle cell. A "differentiated" cell is one that has taken on a more specialized ("committed") position within the lineage of a cell. The term "committed", when applied to the process of differentiation, refers to a cell that has proceeded in the differentiation pathway to a point where, under normal circumstances, it will continue to differentiate into a specific cell type or subset of cell types, and cannot, under normal circumstances, differentiate into a different cell type or revert to a less differentiated cell type. "De-differentiation" refers to the process by which a cell reverts to a less specialized (or committed) position within the lineage of a cell. As used herein, the "lineage" of a cell defines the heredity of the cell, i.e., which cells it came from and what cells it can give rise to. The lineage of a cell places the cell within a hereditary scheme of development and differentiation.

In a broad sense, a "progenitor cell" is a cell that has the capacity to create progeny that are more differentiated than itself, and yet retains the capacity to replenish the pool of progenitors. By that definition, stem cells themselves are also progenitor cells, as are the more immediate precursors to terminally differentiated cells. When referring to the cells of the present invention, as described in more detail below, this broad definition of progenitor cell may be used. In a narrower sense, a progenitor cell is often defined as a cell that is intermediate in the differentiation pathway, i.e., it arises from a stem cell and is intermediate in the production of a mature cell type or subset of cell types. This type of progenitor cell is generally not able to self-renew. Accordingly, if this type of cell is referred to herein, it will be referred to as a "non-renewing progenitor cell" or as an "intermediate progenitor or precursor cell."

Generally, a "trophic factor" is defined as a substance that promotes survival, growth, proliferation, and/or maturation of a cell, or stimulates increased activity of a cell.

The term "standard growth conditions," as used herein refers to culturing of cells at 37° C., in a standard atmosphere comprising 5% $CO_2$ and relative humidity maintained at about 100%. While the foregoing conditions are useful for culturing, it is to be understood that such conditions are capable of being varied by the skilled artisan who will appreciate the options available in the art for culturing cells.

The term "isolate" as used herein generally refers to a cell, which has been separated from its natural environment. This term includes gross physical separation from its natural environment, e.g., removal from the donor animal. In preferred embodiments, an isolated cell is not present in a tissue, i.e., the cell is separated or dissociated from the neighboring cells with which it is normally in contact. Preferably, cells are administered as a cell suspension. As used herein, the phrase "cell suspension" includes cells which are in contact with a medium and which have been dissociated, e.g., by subjecting a piece of tissue to gentle trituration.

"Anchorage-dependent cells" are cells, including mammalian cells, which need to attach to a surface, e.g., a tissue culture flask surface or a microcarrier particle surface, to replicate in tissue culture.

As used herein, the term "about" when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

I. Compositions for Cryopreservation

One aspect of the invention is directed to compositions for cryopreservation of human umbilical cord tissue-derived cells. The compositions of the invention are unique in that they are suitable for administration and that they are formulated to maintain high viability after thaw and maintain high cell survival during cryopreservation. Thus, cells may be cryopreserved in the compositions and the compositions may be administered to a subject after thawing. The compositions also prevent cellular swelling, control free radical accumulation, and maintain acidosis as well as iconic and osmotic balance.

In one embodiment of the invention, the cryopreservation compositions comprise select amino acids, vitamins, inorganic salts and other components. One or more of the other components may act as cryoprotectants.

A. Amino Acids

In one embodiment, the composition comprises the amino acids L-Arginine, L-Glutamine, Glycine, L-Isoleucine, L-Leucine, L-Lysine, HCl, L-Methionine, L-Phenylalanine, L-Serine, L-Threonine, L-Tryptophan, and L-Valine.

In another embodiment, the composition comprises from about 37.8 to about 75.6 mg/L, alternatively at least about 37.8 mg/L, alternatively at least about 75.6 mg/L of L-Arginine. In yet another embodiment, the composition comprises from about 262.8 to about 525.6 mg/L, alternatively at least about 262.8 mg/L, alternatively at least about 525.6 mg/L of L-Glutamine. In another embodiment, the composition comprises from about 13.5 to about 27 mg/L, alternatively at least about 13.5 mg/L, alternatively at least about 27 mg/L of Glycine. In another embodiment, the composition comprises from about 47.16 to about 94.23 mg/L, alternatively at least about 47.16, alternatively at least about 94.32 of L-Isoleucine and L-Leucine. In another embodiment, the composition comprise from about 67.79 to about 131.58 mg/L, alternatively at least about 67.79 mg/L, alternatively at least about 131.58 mg/L of L-Lysine. In yet another embodiment, the composition comprises from about 13.5 to about 27 mg/L, alternatively at least about 13.5 mg/L, alternatively at least about 27 mg/L of L-Methionine. In yet another embodiment, the composition comprises from about 29.7 to about 59.4 mg/L, alternatively at least about 29.7 mg/L, alternatively at least about 59.4 mg/L of Phenylalanine. In an alternate embodiment, the composition comprises from about 18.9 to about 37.8 mg/L, alternatively at least about 18.9, alternatively at least about 37.8 mg/L of Serine. In one embodiment, the composition comprises from about 42.75 to about 85.5 mg/L, alternatively at least about 42.75 mg/L, alternatively at least about 85.5 mg/L of L-Threonine. In an alternate embodiment, the composition comprises from about 7.2 to about 14.4 mg/L, alternatively at least about 7.2 mg/L, alternatively at least about 14.4 mg/L of L-Tryptophan. In yet another embodiment, the composition comprises from about 41.85 to about 83.7 mg/L, alternatively at least about 41.85 mg/L, alternatively at least about 83.7 mg/L of L-Valine.

In one embodiment, the composition comprises from about 37.8 to about 75.6 mg/L of L-Arginine, from about 262.8 to about 525.6 mg/L of L-Glutamine, from about 13.5 to about 27 mg/L of L-Glycine, from about 47.16 to about 94.32 mg/L of L-Isoleucine, from about 47.16 to about 94.32 mg/L of L-Leucine, from about 65.79 to about 131.58 mg/L of L-Lysine, HCl, from about 13.5 to about 27 mg/L of L-Methionine, from about 29.7 to about 59.4 mg/L of L-Phenylalanine, from about 18.9 to about 37.8 mg/L of L-Serine, from about 42.75 to about 85.5 mg/L of L-Threonine, from about 7.2 to about 14.4 mg/L of L-Tryptophan and from about 41.85 to about 83.7 mg/L of L-Valine.

In another embodiment, the composition comprises about 37.8 mg/L of L-Arginine, about 262.8 mg/L of L-Glutamine, about 13.5 mg/L of L-Glycine, about 47.16 mg/L of L-Isoleucine, about 47.16 mg/L of L-Leucine, about 65.79 mg/L of L-Lysine, HCl, about 13.5 mg/L of L-Methionine, about 29.7 mg/L of L-Phenylalanine, about 18.9 mg/L of L-Serine, about 42.75 5 mg/L of L-Threonine, about 7.2 mg/L of L-Tryptophan and 41.85 mg/L of L-Valine.

In yet another embodiment, the composition comprises about 75.6 mg/L of L-Arginine, about 525.6 mg/L of L-Glutamine, about 27 mg/L of L-Glycine, about 94.32 mg/L of L-Isoleucine, about 94.32 mg/L of L-Leucine, about 131.58 mg/L of L-Lysine, HCl, about 27 mg/L of L-Methionine, about 59.4 mg/L of L-Phenylalanine, about 37.8 mg/L of L-Serine, about 85.5 mg/L of L-Threonine, 14.4 mg/L of L-Tryptophan and about 83.7 mg/L of L-Valine.

B. Vitamins

In another embodiment, the composition further comprises the vitamins D-calcium pantothenate, choline chloride, folic acid, niacinamide, pyridoxine HCl, thiamine HCl, and riboflavin.

In one embodiment, the composition comprises from about 1.8 to about 3.6 mg/L, alternatively at least about 1.8 mg/L, alternatively at least about 3.6 mg/L of one or more, preferable of each of the vitamins, D-calcium pantothenate, choline chloride, folic acid, niacinamide, pyridoxine HCl and thiamine. In one embodiment, the composition comprises from about 0.18 to about 0.36 mg/L, alternatively at least about 0.18 mg/L, alternatively at least about 0.36 mg/L of riboflavin.

In one embodiment, the composition comprises from about 0.18 to about 0.36 mg/L of riboflavin and from about 1.8 to about 3.6 mg/L of each of the vitamins, D-calcium pantothenate, choline chloride, folic acid, niacinamide, pyridoxine HCl, and thiamine.

In another embodiment, the composition comprises about 0.18 mg/L of riboflavin and about 1.8 mg/L of each of the vitamins, D-calcium pantothenate, choline chloride, folic acid, niacinamide, pyridoxine, HCl, and thiamine.

In an alternate embodiment, the composition comprises about 0.36 mg/L of riboflavin and about 3.6 mg/L of each of the vitamins, D-calcium pantothenate, choline chloride, folic acid, niacinamide, pyridoxine HCl, and thiamine.

C. Inorganic Salts

In yet another alternate embodiment, the composition further comprises the inorganic salts potassium chloride, USP, sodium bicarbonate, USP, sodium chloride, USP, and sodium phosphate, monobasic, $H_2O$. In one embodiment, the composition further comprises calcium chloride dihydrate ($CaCl_2.2H_2O$), magnesium chloride ($MgCl_2.6H_2O$), potassium bicarbonate ($KHCO_3$), and potassium monophosphate ($KH_2PO_4$). In another embodiment, the cryopreservation composition does not comprise calcium chloride dihydrate ($CaCl_2.2H_2O$), magnesium chloride ($MgCl_2.6H_2O$), potassium bicarbonate ($KHCO_3$), and potassium monophosphate ($KH_2PO_4$).

In another embodiment, the composition comprises from about 360 to about 432 mg/L, alternatively at least about 360 mg/L, alternatively at least about 432 of potassium chloride, USP. In another embodiment, the composition comprises from about 2565 to about 3330 mg/L, alternatively at least about 2565 mg/L, alternatively at least about 3330 mg/L of sodium bicarbonate, USP. In one embodiment, the composition comprises from about 2880 to about 5760 mg/L, alternatively at least about 2880 mg/L, alternatively at least about 5760 mg/L of sodium chloride, USP. In another embodiment, the composition comprises from about 56.25 to about 112.5 mg/L, alternatively at least about 56.25 mg/L, alternatively at least about 112.5 mg/L of sodium phosphate, monobasic, $H_2O$. In certain embodiments, the composition further comprises one or more of: (a) at least about 3.2 mg/L, alternatively at least about 32 mg/L of calcium chloride dihydrate ($CaCl_2.2H_2O$); (b) at least about 458 mg/L of magnesium chloride ($MgCl_2.6H_2O$); (c) at least about 225 mg/L of potassium bicarbonate ($KHCO_3$); and (d) at least about 612 mg/L of potassium monophosphate ($KH_2PO_4$).

In an alternate embodiment, the composition comprises from about 360 to about 432 mg/L of potassium chloride, USP, from about 2565 to about 3330 mg/L of sodium bicarbonate, USP, from about 2880 to about 5760 mg/L of sodium chloride, USP and from about 56.25 to about 112.5 mg/L of sodium phosphate monobasic, $H_2O$.

In one embodiment, the composition comprises about 360 mg/L of potassium chloride, USP, about 3330 mg/L of sodium bicarbonate, USP, about 5760 mg/L of sodium chloride, USP and about 112.5 mg/L of sodium phosphate monobasic, $H_2O$. Preferably, this cryopreservation composition does not comprise calcium chloride dihydrate ($CaCl_2.2H_2O$), magnesium chloride ($MgCl_2.6H_2O$), potassium bicarbonate ($KHCO_3$), and potassium monophosphate ($KH_2PO_4$).

In another embodiment, the composition comprises about 432 mg/L of potassium chloride, USP, about 2565 mg/L of sodium bicarbonate, USP, about 2880 of sodium chloride, USP, about 56.25 mg/L of sodium phosphate monobasic, $H_2O$, about 32 mg/L of calcium chloride dihydrate ($CaCl_2.2H_2O$), about 458 mg/L of magnesium chloride ($MgCl_2.6H_2O$), about 225 mg/L of potassium bicarbonate ($KHCO_3$), and about 612 mg/L of potassium monophosphate ($KH_2PO_4$).

In an alternate embodiment, the composition comprises about 432 mg/L of potassium chloride, about 2565 0 mg/L of sodium bicarbonate, USP, about 2880 of sodium chloride, about 56.25 mg/L of sodium phosphate monobasic, $H_2O$, about 3.2 mg/L of calcium chloride dihydrate ($CaCl_2.2H_2O$), about 458 mg/L of magnesium chloride ($MgCl_2.6H_2O$), about 225 mg/L of potassium bicarbonate ($KHCO_3$), and about 612 mg/L of potassium monophosphate ($KH_2PO_4$).

D. Other Components

In another embodiment, the composition further comprises DMSO, dextrose, anhydrous, USP, sucrose, and mannitol. In yet another embodiment, the composition further comprises lactobionic acid and glutathione.

Without being bound by theory, in certain embodiments of the invention, lactobionic acid, sucrose, mannitol, glutathione, and/or DMSO may act as cryoprotectants.

The compositions may comprise from about 5% to about 10% v/v of DMSO. In certain embodiments, the compositions comprise 5%, 7%, or 10% v/v of DMSO.

In one embodiment, the composition comprises from about 855 mg/L to about 900 mg/L, alternatively at least about 855 mg/L, alternatively at least about 900 mg/L of dextrose, anhydrous, USP. In another embodiment, the composition comprises from about 3081 to about 6160 mg/L, alternatively from about 2460 to about 3695 alternatively at least about 2300 mg/L, alternatively at least about 2400 mg/L, alternatively at least about 4900 mg/L, alternatively at least about 3081 mg/L, alternatively at least about 6160 mg/L, alternatively about 2460 mg/L, alternatively about 4,900 mg/L, alternatively at least about 7400 mg/L, alternatively from about 5,400 to about 8,400 mg/L of sucrose. In an alternate embodiment, the composition comprises from about 1310 to about 1967 mg/L, alternatively from about 2620 to about 3940 mg/L, alternatively from about 1310 to about 3940, alternatively at least about 1639 mg/L, alternatively at least about 3240 mg/L, alternatively about 1639 mg/L, alternatively about 3240 mg/L of mannitol. In another embodiment, the composition comprises from about 12,000 to about 20,000 mg/L, alternatively at least about 16,000 mg/L, alternatively about 16123 mg/L, alternatively about 12,000 mg/L, alternatively about 16,000 mg/L, alternatively 19,000 mg/L of lactobionic acid. In yet another embodiment, the composition comprises from about 415 to about 500 mg/L, alternatively from about 329 to about 495 mg/L, alternatively at least about 415 mg/L, alternatively about 415 mg/L, alternatively about 329 mg/L, alternatively about 495 mg/L of glutathione.

In one embodiment, the composition comprises from about 5 to about 10% v/v of DMSO, at least about 900 mg/L of dextrose, anhydrous, USP, from about 4932 to about 7100 mg/L, alternatively about 6160 mg/L of sucrose and from about 2620 to about 3940 mg/L, alternatively about 3240 mg/L of mannitol. Preferably, this embodiment of the composition does not comprise (i.e. is free of) lactobionic acid and glutathione.

In another embodiment, the composition comprises from about 5 to about 10% v/v of DMSO, at least about 855 mg/L of dextrose, anhydrous, USP, from about 2460 to about 3700 mg/L, alternatively at least about 2460 mg/L of sucrose, from about 1310 to about 2000 mg/L, alternatively at least about 1639 mg/L, alternatively about 1639 mg/L of mannitol, from about 12,000 to about 20000 mg/L, alternatively at least about 16,000 mg/L, alternatively about 16,000 mg/L of lactobionic acid, and from about 300 to about 500 mg/L, alternatively at least about 415 mg/L, alternatively about 415 mg/L of glutathione.

E. Additional Embodiments

One embodiment of the invention is a composition suitable for cryopreservation of umbilical cord tissue-derived cells comprising: the amino acids L-Arginine, L-Glutamine, Glycine, L-Isoleucine, L-Leucine, L-Lysine, HCl, L-Methionine, L-Phenylalanine, L-Serine, L-Threonine, L-Tryptophan and L-Valine; the vitamins D-calcium pantothenate, choline chloride, folic acid, niacinamide, pyridoxine HCl, riboflavin and thiamine HCl; the inorganic salts potassium chloride (USP), sodium bicarbonate (USP), sodium chloride (USP) and sodium phosphate monobasic, $H_2O$; and DMSO, dextrose (anhydrous USP), sucrose and mannitol.

In one embodiment, this composition comprises: from about 37.8 to about 75.6 mg/L of L-Arginine, from about 262.8 to about 525.6 mg/L of L-Glutamine, from about 13.5 to about 27 mg/L of L-Glycine, from about 47.16 to about 94.32 mg/L of L-Isoleucine, from about 47.16 to about 94.32 mg/L of L-Leucine, from about 65.79 to about 131.58 mg/L of L-Lysine, HCl, from about 13.5 to about 27 mg/L of L-Methionine, from about 29.7 to about 59.4 mg/L of L-Phenylalanine, from about 18.9 to about 37.8 mg/L of L-Serine, from about 42.75 to about 85.5 mg/L of L-Threonine, from about 7.2 to about 14.4 mg/L of L-Tryptophan and from about 41.85 to about 83.7 mg/L of L-Valine; from about 0.18 to about 0.36 mg/L of riboflavin and from about 1.8 to about 3.6 mg/L of each of the vitamins, D-calcium pantothenate, choline chloride, folic acid, niacinamide, pyridoxine HCl, and thiamine; from about 360 to about 432 mg/L of potassium chloride (USP), from about 2565 to about 3330 mg/L of sodium bicarbonate (USP), from about 2880 to about 5760 mg/L of sodium chloride (USP) and from about 56.25 to about 112.5 mg/L of sodium phosphate monobasic, $H_2O$; and from about 5 to about 10% of DMSO, from about 855 mg/L to about 900 mg/L of dextrose, from about 3081 to about 6160 mg/L of sucrose and from about 1639 to about 3240 mg/L of mannitol.

In one embodiment of the invention, this composition does not further comprise the inorganic salts calcium chloride dihydrate ($CaCl_2.2H_2O$), magnesium chloride ($MgCl_2.6H_2O$), potassium bicarbonate ($KHCO_3$) and potassium monophosphate ($KH_2PO_4$). In yet another embodiment, the composition also does not comprise lactobionic acid and glutathione. In an alternate embodiment, this composition is free of calcium chloride dihydrate ($CaCl_2.2H_2O$), magnesium chloride ($MgCl_2.6H_2O$), potassium bicarbonate ($KHCO_3$), potassium monophosphate ($KH_2PO_4$), lactobionic acid, and glutathione. Accordingly, in one embodiment, the composition comprises at least about 75.6 mg/L of L-Arginine, at least about 525.6 mg/L of L-Glutamine, at least about 27 mg/L of L-Glycine, at least about 94.32 mg/L of L-Isoleucine, at least about 94.32 mg/L of L-Leucine, at least about 131.58 mg/L of L-Lysine, HCl, at least about 27 mg/L of L-Methionine, at least about 59.4 mg/L of L-Phenylalanine, at least about 37.8 mg/L of L-Serine, at least about 85.5 mg/L of L-Threonine, 14.4 mg/L of L-Tryptophan and at least about 83.7 mg/L of L-Valine; at least about 0.36 mg/L of riboflavin and at least about 3.6 mg/L of each of the vitamins, D-calcium pantothenate, choline chloride, folic acid, niacinamide, pyridoxine HCl, and thiamine; at least about 360 mg/L of potassium chloride, at least about 3330 mg/L of sodium bicarbonate, at least about 5760 mg/L of sodium chloride, and at least about 112.5 mg/L of sodium phosphate monobasic, $H_2O$; and from about 5 to about 10% v/v of DMSO, at least about 900 mg/L of dextrose (anhydrous USP), at least about 6160 mg/L of sucrose and at least about 3240 mg/L of mannitol.

Another embodiment of the invention is a composition for cryopreservation of umbilical cord tissue-derived cells comprising: the amino acids L-Arginine, L-Glutamine, Glycine, L-Isoleucine, L-Leucine, L-Lysine, HCl, L-Methionine, L-Phenylalanine, L-Serine, L-Threonine, L-Tryptophan and L-Valine; the vitamins D-calcium pantothenate, choline chloride, folic acid, niacinamide, pyridoxine, HCl, riboflavin and thiamine, HCl; the inorganic salts potassium chloride, USP, sodium bicarbonate, USP, sodium chloride, USP and sodium phosphate, monobasic, $H_2O$, calcium chloride dihydrate ($CaCl_2.2H_2O$) magnesium chloride ($MgCl_2.6H_2O$) potassium bicarbonate ($KHCO_3$) and potassium monophosphate ($KH_2PO_4$); and DMSO, dextrose (anhydrous USP), sucrose, mannitol, lactobionic acid and glutathione.

In one embodiment, this composition comprises: at least about 37.8 mg/L of L-Arginine, at least about 262.8 mg/L of L-Glutamine, at least about 13.5 mg/L of L-Glycine, at least about 47.16 mg/L of L-Isoleucine, at least about 47.16 mg/L of L-Leucine, at least about 65.79 mg/L of L-Lysine, HCl, at least about 13.5 mg/L of L-Methionine, at least about 29.7 mg/L of L-Phenylalanine, at least about 18.9 mg/L of L-Serine, at least about 42.75 5 mg/L of L-Threonine, at least about 7.2 mg/L of L-Tryptophan and 41.85 mg/L of L-Valine; at least about 0.18 mg/L of riboflavin and at least about 1.8 mg/L of each of the vitamins, D-calcium pantothenate, choline chloride, folic acid, niacinamide, pyridoxine HCl, and thiamine; at least about 432 mg/L of potassium chloride, USP, about 2565 mg/L of sodium bicarbonate, USP, about 2880 of sodium chloride, USP, at least about 56.25 mg/L of sodium phosphate monobasic, $H_2O$, at least about 3.2 mg/L of calcium chloride dihydrate ($CaCl_2.2H_2O$), at least about 458 mg/L of magnesium chloride ($MgCl_2.6H_2O$), at least about 225 mg/L of potassium bicarbonate ($KHCO_3$) and at least about 612 mg/L of potassium monophosphate ($KH_2PO_4$), and from about 5 to about 10% v/v of DMSO, at least about 855 mg/L of dextrose (anhydrous USP), at least about 415 mg/L of glutathione; at least about 3081 mg/L sucrose and at least about 1639 mg/L of mannitol.

Other embodiments of compositions of the invention are shown in the Table below. With reference to the amounts of each component listed in the Table, the amounts are approximate values only. Variations of ±20% or ±10%, more preferably ±5%, even more preferably ±1%, and still more preferably ±0.1% from the specified value are also encompassed by these embodiments.

| Component | Type | Embodiment A (mg/L) | Embodiment B (mg/L) |
|---|---|---|---|
| L-Arginine | amino acid | 37.8 | 75.6 |
| L-Glutamine | amino acid | 262.8 | 525.6 |
| Glycine | amino acid | 13.5 | 27 |
| L-Isoleucine | amino acid | 47.16 | 94.32 |
| L-Leucine | amino acid | 47.16 | 94.32 |
| L-Lysine, HCl | amino acid | 65.79 | 131.58 |
| L-Methionine | amino acid | 13.5 | 27 |
| L-Phenylalanine | amino acid | 29.7 | 59.4 |
| L-Serine | amino acid | 18.9 | 37.8 |
| L-Threonine | amino acid | 42.75 | 85.5 |
| L-Tryptophan | amino acid | 7.2 | 14.4 |
| L-Valine | amino acid | 41.85 | 83.7 |
| D-calcium pantothenate | vitamin | 1.8 | 3.6 |
| choline chloride | vitamin | 1.8 | 3.6 |
| folic acid | vitamin | 1.8 | 3.6 |
| niacinamide | vitamin | 1.8 | 3.6 |
| pyridoxine, HCl | vitamin | 1.8 | 3.6 |
| riboflavin | vitamin | 0.18 | 0.36 |
| thiamine, HCl | vitamin | 1.8 | 3.6 |
| potassium chloride, USP | inorganic salt | 432 | 360 |
| sodium bicarbonate, USP | inorganic salt | 2565 | 3330 |
| sodium chloride, USP | inorganic salt | 2880 | 5760 |
| sodium phosphate, monobasic, $H_2O$ | inorganic salt | 56.25 | 112.5 |
| calcium chloride dihydrate ($CaCl_2 \cdot 2H_2O$) | inorganic salt | 32 or 3.2 (low calcium) | 0 |
| magnesium chloride ($MgCl_2 \cdot 6H_2O$) | inorganic salt | 458 | 0 |
| potassium bicarbonate ($KHCO_3$) | inorganic salt | 225 | 0 |
| potassium monophosphate ($KH_2PO_4$) | inorganic salt | 612 | 0 |
| lactobionic acid | other | 16123 | 0 |
| glutathione | other | 415 | 0 |
| DMSO | other | 10% v/v | 10% v/v |
| dextrose, anhydrous, USP | other | 855 | 900 |
| sucrose | other | 3081 | 6160 |
| mannitol | other | 1639 | 3240 |

With reference to Embodiments A and B above, the amounts of lactobionic acid, glutathione, DMSO, dextrose, anhydrous, USP, sucrose, and mannitol may vary depending on the use of the compositions. The amount of DMSO may range from about 5% to about 10% v/v. In one embodiment, Embodiment A comprises 3.2 mg/L of calcium chloride dihydrate ($CaCl_2.2H_2O$). For Embodiment A, the amounts lactobionic acid, sucrose, mannitol, and glutathione may vary and include the amounts of these components listed in Table 1-8. Similarly, for Embodiment B, the amounts of sucrose and mannitol may also vary and include the amounts of these components listed in Table 1-7.

II. Methods of Cryopreserving

Another aspect of the invention is a method of cryopreserving human umbilical cord tissue-derived cells utilizing the cryopreservation compositions of the invention.

Broadly, the method of cryopreserving comprises the steps of providing umbilical cord tissue-derived cells, placing the cells in the cryopreservation composition of the invention, and cooling those cells for a desired period of time to achieve the desired cryopreservation temperature of the cells. Preferably, the desired cryopreservation temperature is −120° C.

In one embodiment, the method comprises placing the hUTC in a cryopreservation composition and allowing the composition to achieve a starting temperature of 4° C. Once the compositions comprising the cells achieve the start temperature, they are kept at that temperature for approximately 15 minutes. After being held at this temperature for approximately 15 minutes, the cells are cooled at a rate of about −1.0° C./min until the cell composition achieves a temperature of about −3.0° C. In alternate embodiment, the method comprises cooling the cell composition from a starting temperature of 4° C. at a rate of about −1.0° C./min until the cell composition achieves a temperature of about −3.0° C. Once the cell composition is at a temperature of about −3.0° C., the composition is further cooled at a rate of −25.0° C./min until the cell composition achieves a temperature of about −50.0° C. Once the cell composition is at a temperature of about −50.0° C., the composition is heated at a rate of 10.0° C./min until the cell composition achieves a temperature of about −20.0° C. Once the cell composition is at a temperature of about −20.0° C., the composition is cooled again at a rate of −1.0° C./min until the cell composition achieves a temperature of about −45.0° C. Then, once the composition is at a temperature of about −45.0° C., the composition is further cooled at a rate of −10.0° C./min until the cell composition achieves a storage temperature of about −120.0° C.

In one embodiment, the method comprises placing the hUTC in a cryopreservation composition and allowing the composition to achieve a starting temperature of 4° C. The cells are then cooled at a rate of 1° C./min between 4° C. and −45° C. Then, once the composition is at a temperature of about −45.0° C., the composition is further cooled until the cell composition achieves a storage temperature of about −120.0° C.

When the cells are at the storage temperature, they may be stored for a desired period such as e.g. 2 months, 3 months, 6 months, 12 months, or 24 months. Preferably, the cells are stored in liquid nitrogen (such as e.g. a liquid nitrogen freezer) until their use.

III. Kits Comprising the Culture Medium and Serum-Free Nutrient Solution

Another embodiment of the invention is a kit for cryopreserving umbilical cord tissue-derived cells. In one embodiment, the kit comprises the compositions of the invention. The kit may further comprise the cells and instructions for cryopreservation. In another embodiment, the kit comprises hUTC cryopreserved in a composition of the invention and instructions for using the hUTC. In one embodiment, the hUTC cryopreserved in the composition may be formulated for intravenous (IV) infusion.

IV. Human Umbilical Cord Tissue-Derived Cells (hUTC)

As discussed above, the compositions, kits, and methods for cryopreservation may be used to cryopreserve isolated human umbilical cord tissue derived-cells ("hUTC" or "UTC"). The UTC and UTC populations suitable for use with the cryopreservation compositions, kits, and methods of the present invention are described in detail in detailed herein below as well as U.S. Pat. Nos. 7,510,873 and 7,524,489.

A. Isolation and Growth of Umbilical Cord-Tissue Derived Cells

According to the methods described herein, a mammalian umbilical cord is recovered upon or shortly after termination of either a full-term or a pre-term pregnancy, e.g., after expulsion of after birth. The postpartum tissue may be transported from the birth site to a laboratory in a sterile container such as a flask, beaker, culture dish, or bag. The container may have a solution or medium, including but not limited to a salt solution, such as Dulbecco's Modified Eagle's Medium (DMEM) (also known as Dulbecco's Minimal Essential Medium) or phosphate buffered saline (PBS), or any solution used for transportation of organs used for transplantation, such as University of Wisconsin solution or perfluorochemical solution. One or more antibiotic and/or antimycotic agents, such as but not limited to penicillin, streptomycin, amphotericin B, gentamicin, and nystatin, may be added to the medium or buffer. The postpartum tissue may be rinsed with an anticoagulant solution such as heparin-containing solution. It is preferable to keep the tissue at about 4-10° C. prior to extraction of UTC. It is even more preferable that the tissue not be frozen prior to extraction of UTC.

Isolation of UTC preferably occurs in an aseptic environment. The umbilical cord may be separated from the placenta by means known in the art. Alternatively, the umbilical cord and placenta are used without separation. Blood and debris are preferably removed from the postpartum tissue prior to isolation of UTC. For example, the postpartum tissue may be washed with buffer solution, including but not limited to phosphate buffered saline. The wash buffer also may comprise one or more antimycotic and/or antibiotic agents, including but not limited to penicillin, streptomycin, amphotericin B, gentamicin, and nystatin.

Postpartum tissue comprising an umbilical cord or a fragment or section thereof is disaggregated by mechanical force (mincing or shear forces). In a presently preferred embodiment, the isolation procedure also utilizes an enzymatic digestion process. Many enzymes are known in the art to be useful for the isolation of individual cells from complex tissue matrices to facilitate growth in culture. Digestion enzymes range from weakly digestive (e.g. deoxyribonucleases and the neutral protease, dispase) to strongly digestive (e.g. papain and trypsin), and are available commercially. A non-exhaustive list of enzymes compatible herewith includes mucolytic enzyme activities, metalloproteases, neutral proteases, serine proteases (such as trypsin, chymotrypsin, or elastase), and deoxyribonucleases. Presently preferred are enzyme activities selected from metalloproteases, neutral proteases and mucolytic activities. For example, collagenases are known to be useful for isolating various cells from tissues. Deoxyribonucleases can digest single-stranded DNA and can minimize cell clumping during isolation. Preferred methods involve enzymatic treatment with e.g. collagenase and dispase, or collagenase, dispase, and hyaluronidase. In certain embodiments, a mixture of collagenase and the neutral protease dispase are used in the dissociating step. More specific embodiments employ digestion in the presence of at least one collagenase from *Clostridium histolyticum*, and either of the protease activities, dispase, and thermolysin. Still other embodiments employ digestion with both collagenase and dispase enzyme activities. Also utilized are methods that include digestion with a hyaluronidase activity in addition to collagenase and dispase activities. The skilled artisan will appreciate that many such enzyme treatments are known in the art for isolating cells from various tissue sources. For example, the enzyme blends for tissue disassociation sold under the trade name LIBERASE (Roche, Indianapolis, Ind.) are suitable for use in the instant methods. Other sources of enzymes are known, and the skilled artisan may also obtain such enzymes directly from their natural sources. The skilled artisan is also well equipped to assess new or additional enzymes or enzyme combinations for their utility in isolating the cells of the invention. Preferred enzyme treatments are 0.5, 1, 1.5, or 2 hours long or longer. In other preferred embodiments, the tissue is incubated at 37° C. during the enzyme treatment of the dissociation step.

In some embodiments of the invention, postpartum tissue is separated into sections comprising various aspects of the tissue, such as neonatal, neonatal/maternal, and maternal aspects of the placenta, for instance. The separated sections then are dissociated by mechanical and/or enzymatic dissociation according to the methods described herein. Cells of neonatal or maternal lineage may be identified by any means known in the art, e.g. by karyotype analysis or in situ hybridization for a Y chromosome.

Isolated cells or umbilical cord tissue from which a UTC is derived may be used to initiate, or seed, cell cultures. Isolated cells are transferred to sterile tissue culture vessels either uncoated or coated with extracellular matrix or ligands such as laminin, collagen (native, denatured or cross-linked), gelatin, fibronectin, and other extracellular matrix proteins. In addition to the culture media disclosed herein, a UTC may be cultured in any culture medium capable of sustaining growth of the cell such as, but not limited to, DMEM (high or low glucose), advanced DMEM, DMEM/MCDB 201, Eagle's basal medium, Ham's F10 medium (F10), Ham's F-12 medium (F12), Iscove's modified Dulbecco's medium, Mesenchymal Stem Cell Growth Medium (MSCGM), DMEM/F12, RPMI 1640, and serum/media free medium sold under the trade name CELL-GRO-FREE (Mediatch, Inc., Herndon, Va.). The culture medium may be supplemented with one or more components including, e.g., fetal bovine serum (FBS), preferably about 2-15% (v/v); equine serum (ES); human serum (HS); beta-mercaptoethanol (BME or 2-ME), preferably about 0.001% (v/v); one or more growth factors, e.g., platelet-derived growth factor (PDGF), epidermal growth factor (EGF), fibroblast growth factor (FGF), vascular endothelial growth factor (VEGF), insulin-like growth factor-1 (IGF-1), leukocyte inhibitory factor (LIF) and erythropoietin (EPO); amino acids, including L-valine; and one or more antibiotic and/or antimycotic agents to control microbial contamination, such as penicillin G, streptomycin sulfate, amphotericin B, gentamicin, and nystatin, either alone or in combination. The culture medium may comprise Growth Medium as defined in the Examples.

The cells are seeded in culture vessels at a density to allow cell growth. In a preferred embodiment, the cells are cultured at about 0 to about 5% by volume $CO_2$ in air. In some preferred embodiments, the cells are cultured at about 2 to about 25% $O_2$ in air, preferably about 5 to about 20% $O_2$ in air. The cells preferably are cultured at a temperature of about 25 to about 40° C. and more preferably are cultured at 37° C. The cells are preferably cultured in an incubator. The medium in the culture vessel can be static or agitated, e.g., using a bioreactor. The UTC is preferably grown under low oxidative stress (e.g., with addition of glutathione, vitamin C, Catalase, vitamin E, N-Acetylcysteine). "Low oxidative stress" refers to conditions of no or minimal free radical damage to the cultured cells.

Methods for the selection of the most appropriate culture medium, medium preparation, and cell culture techniques are well known in the art and are described in a variety of sources, including Doyle et al., (eds.), 1995, Cell & Tissue Culture: Laboratory Procedures, John Wiley & Sons, Chichester; and Ho and Wang (eds.), 1991, Animal Cell Bioreactors, Butterworth-Heinemann, Boston, which are incorporated herein by reference.

After culturing the isolated cells or tissue fragments for a sufficient period, a UTC will have grown out, either because of migration from the postpartum tissue or cell division, or both. In some embodiments of the invention, the UTC is passaged, or removed to a separate culture vessel containing fresh medium of the same or a different type as that used initially, where the population of cells can be mitotically expanded. The cells of the invention may be used at any point between passage 0 and senescence. The cells preferably are passaged between about 3 and about 25 times, more preferably are passaged about 4 to about 12 times, and preferably are passaged 10 or 11 times. Cloning and/or subcloning may be performed to confirm that a clonal population of cells has been isolated.

In certain embodiments, the different cell types present in postpartum tissue are fractionated into subpopulations from which the UTC can be isolated. Fractionation or selection may be accomplished using standard techniques for cell separation including, but not limited to, enzymatic treatment to dissociate postpartum tissue into its component cells, followed by cloning and selection of specific cell types, including but not limited to selection based on morphological and/or biochemical markers; selective growth of desired cells (positive selection), selective destruction of unwanted cells (negative selection); separation based upon differential cell agglutinability in the mixed population such as, e.g., with soybean agglutinin; freeze-thaw procedures; differential adherence properties of the cells in the mixed population; filtration; conventional and zonal centrifugation; centrifugal elutriation (counter-streaming centrifugation); unit gravity separation; countercurrent distribution; electrophoresis; and fluorescence activated cell sorting (FACS). For a review of clonal selection and cell separation techniques, see Freshney, 1994, Culture of Animal Cells: A Manual of Basic Techniques, 3rd Ed., Wiley-Liss, Inc., New York, which is incorporated herein by reference.

The culture medium is changed as necessary, e.g., by carefully aspirating the medium from the dish, e.g., with a pipette, and replenishing with fresh medium. Incubation is continued until a sufficient number or density of cells accumulates in the dish. The original explanted tissue sections may be removed and the remaining cells trypsinized using standard techniques or using a cell scraper. After trypsinization, the cells are collected, removed to fresh medium, and incubated as above. In some embodiments, the medium is changed at least once at approximately 24 hours post-trypsinization to remove any floating cells. The cells remaining in culture are considered to be UTC.

The UTC may be cryopreserved inter alia utilizing the compositions of the invention. Accordingly, UTC for autologous transfer (for either the mother or child) may be derived from appropriate postpartum tissues following the birth of a child, then cryopreserved so as to be available in the event they are later needed for transplantation.

B. Characteristics of Umbilical Cord Tissue-Derived Cells

The UTC may be characterized, e.g., by growth characteristics (e.g., population doubling capability, doubling time, passages to senescence), karyotype analysis (e.g., normal karyotype; maternal or neonatal lineage), flow cytometry (e.g., FACS analysis), immunohistochemistry and/or immunocytochemistry (e.g., for detection of epitopes), gene expression profiling (e.g., gene chip arrays; polymerase chain reaction (e.g., reverse transcriptase PCR, real time PCR, and conventional PCR)), protein arrays, protein secretion (e.g., by plasma clotting assay or analysis of PDC-conditioned medium, e.g., by Enzyme Linked ImmunoSorbent Assay (ELISA)), mixed lymphocyte reaction (e.g., as measure of stimulation of PBMCs), and/or other methods known in the art.

Examples of suitable UTC derived from umbilicus tissue were deposited with the American Type Culture Collection (10801 University Boulevard, Manassas, Va. 20110) on Jun. 10, 2004, and assigned ATCC Accession Numbers as follows: (1) strain designation UMB 022803 (P7) was assigned Accession No. PTA-6067; and (2) strain designation UMB 022803 (P17) was assigned Accession No. PTA-6068.

In various embodiments, the UTC possesses one or more of the following growth features: (1) they require L-valine for growth in culture; (2) they are capable of growth in atmospheres containing oxygen from about 5% to at least about 20% (3) they have the potential for at least about 40 doublings in culture before reaching senescence; and (4) they attach and expand on a coated or uncoated tissue culture vessel, wherein the coated tissue culture vessel comprises a coating of gelatin, laminin, collagen, polyornithine, vitronectin or fibronectin.

In certain embodiments, the UTC possesses a normal karyotype, which is maintained as the cells are passaged. Methods for karyotyping are available and known to those of skill in the art.

In other embodiments, the UTC may be characterized by production of certain proteins, including (1) production of at least one of tissue factor, vimentin, and alpha-smooth muscle actin; and (2) production of at least one of CD10, CD13, CD44, CD73, CD90, PDGFr-alpha, PD-L2 and HLA-A, B, C cell surface markers, as detected by flow cytometry. In other embodiments, the UTC may be characterized by lack of production of at least one of CD31, CD34, CD45, CD80, CD86, CD117, CD141, CD178, B7-H2, HLA-G, and HLA-DR, DP, DQ cell surface markers, as detected by flow cytometry. Particularly preferred are cells that produce at least two of tissue factor, vimentin, and alpha-smooth muscle actin. More preferred are those cells producing all three of the proteins tissue factor, vimentin, and alpha-smooth muscle actin.

In other embodiments, the UTC may be characterized by gene expression, which relative to a human cell that is a fibroblast, a mesenchymal stem cell, or an iliac crest bone marrow cell, is increased for a gene encoding at least one of interleukin 8; reticulon 1; chemokine (C-X-C motif) ligand 1 (melonoma growth stimulating activity, alpha); chemokine (C-X-C motif) ligand 6 (granulocyte chemotactic protein 2); chemokine (C-X-C motif) ligand 3; and tumor necrosis factor, alpha-induced protein 3.

In yet other embodiments, the UTC may be characterized by gene expression, which relative to a human cell that is a fibroblast, a mesenchymal stem cell, or an iliac crest bone marrow cell, is reduced for a gene encoding at least one of: short stature homeobox 2; heat shock 27 kDa protein 2; chemokine (C-X-C motif) ligand 12 (stromal cell-derived factor 1); elastin (supravalvular aortic stenosis, Williams-Beuren syndrome); Homo sapiens mRNA; cDNA DKFZp586M2022 (from clone DKFZp586M2022); mesenchyme homeo box 2 (growth arrest-specific homeo box); sine oculis homeobox homolog 1 (Drosophila); crystallin, alpha B; disheveled associated activator of morphogenesis 2; DKFZP586B2420 protein; similar to neuralin 1; tetranectin (plasminogen binding protein); src homology three (SH3) and cysteine rich domain; cholesterol 25-hydroxylase; runt-related transcription factor 3; interleukin 11 receptor, alpha; procollagen C-endopeptidase enhancer; frizzled homolog 7 (Drosophila); hypothetical gene BC008967; collagen, type VIII, alpha 1; tenascin C (hexabrachion); iroquois homeobox protein 5; hephaestin; integrin, beta 8; synaptic vesicle glycoprotein 2; neuroblastoma, suppression of tumorigenicity 1; insulin-like growth factor binding protein 2, 36 kDa; Homo sapiens cDNA FLJ12280 fis, clone MAMMA1001744; cytokine receptor-like factor 1; potassium intermediate/small conductance calcium-activated channel, subfamily N, member 4; integrin, beta 7; transcriptional co-activator with PDZ-binding motif (TAZ); sine oculis homeobox homolog 2 (Drosophila); KIAA1034 protein; vesicle-associated membrane protein 5 (myobrevin); EGF-containing fibulin-like extracellular matrix protein 1; early growth response 3; distal-less homeo box 5; hypothetical protein FLJ20373; aldo-keto reductase family 1, member C3 (3-alpha hydroxysteroid dehydrogenase, type II); biglycan; transcriptional co-activator with PDZ-binding motif (TAZ); fibronectin 1; proenkephalin; integrin, beta-like 1 (with EGF-like repeat domains); Homo sapiens mRNA full length insert cDNA clone EUROIMAGE 1968422; EphA3; KIAA0367 protein; natriuretic peptide receptor C/guanylate cyclase C (atrionatriuretic peptide receptor C); hypothetical protein FLJ14054; Homo sapiens mRNA; cDNA DKFZp564B222 (from clone DKFZp564B222); BCL2/adenovirus E1B 19 kDa interacting protein 3-like; AE binding protein 1; and cytochrome c oxidase subunit VIIa polypeptide 1 (muscle).

In other embodiments, the UTC may be characterized when cultured by secretion of at least one of MCP-1, IL-6, IL-8, GCP-2, HGF, KGF, FGF, HB-EGF, BDNF, TPO, MIP1b, I309, MDC RANTES, and TIMP1. In addition, the UTC may be characterized when cultured by lack of secretion of at least one of TGF-beta2, ANG2, PDGFbb, MIP1A, and VEGF, as detected by ELISA.

In some embodiments, the UTC is derived from umbilical cord tissue substantially free of blood, are capable of self-renewal and expansion in culture, require L-valine for growth, can grow in at least about 5% oxygen, and comprise at least one of the following characteristics: potential for at least about 40 doublings in culture; attachment and expansion on a coated or uncoated tissue culture vessel that comprises a coating of gelatin, laminin, collagen, polyornithine, vitronectin, or fibronectin; production of vimentin and alpha-smooth muscle actin; production of CD10, CD13, CD44, CD73, and CD90; and, expression of a gene, which relative to a human cell that is a fibroblast, a mesenchymal stem cell, or an iliac crest bone marrow cell, is increased for a gene encoding interleukin 8 and reticulon 1. In some embodiments, such UTC does not produce CD45 and CD117.

In preferred embodiments, the cell comprises two or more of the above-listed growth, protein/surface marker production, gene expression, or substance-secretion characteristics. More preferred is a cell comprising three, four, five, or more of the characteristics. Still more preferred is a UTC comprising six, seven, eight, or more of the characteristics. Still more preferred presently is a cell comprising all of above characteristics.

Among cells that are presently preferred for use with the invention in several of its aspects are postpartum cells having the characteristics described above and more particularly those wherein the cells have normal karyotypes and maintain normal karyotypes with passaging, and further wherein the cells express each of the markers CD10, CD13, CD44, CD73, CD90, PDGFr-alpha, and HLA-A, B, C, wherein the cells produce the immunologically-detectable proteins which correspond to the listed markers. Still more preferred are those cells which in addition to the foregoing do not produce proteins corresponding to any of the markers CD31, CD34, CD45, CD117, CD141, or HLA-DR, DP, DQ, as detected by flow cytometry.

In one embodiment, the UTC are isolated from human umbilical cord tissue substantially free of blood, are capable of self-renewal and expansion in culture, have the potential to differentiate, lack the production of CD117 or CD45, and do not express hTERT or telomerase. These UTC optionally express oxidized low density lipoprotein receptor 1, reticulon, chemokine receptor ligand 3, and/or granulocyte chemotactic protein; and/or do not express CD31 or CD34; and/or express, relative to a human fibroblast, mesenchymal stem cell, or iliac crest bone marrow cell, increased levels of interleukin 8 or reticulon 1; and/or express CD10, CD13, CD44, CD73, and CD90.

In another embodiment, the UTC are isolated from human umbilical cord tissue substantially free of blood, are capable of self-renewal and expansion in culture, have the potential to differentiate, express CD13 and CD90, and do not express CD34 and CD117. Optionally, these cells do not express hTERT or telomerase. In yet another embodiment, the cells also express CD10, CD44, and CD43. In an alternate embodiment, the cells also do not express CD45 and CD31. These UTC optionally (i) express oxidized low density lipoprotein receptor 1, reticulon, chemokine receptor ligand 3, and/or granulocyte chemotactic protein; and/or (ii) express, relative to a human fibroblast, mesenchymal stem cell, or iliac crest bone marrow cell, increased levels of interleukin 8 or reticulon 1.

In another embodiment, the UTC are isolated from human umbilical cord tissue substantially free of blood, are capable of self-renewal and expansion in culture, have the potential to differentiate, express CD13, CD90, and HLA-ABC, and do not express CD34, CD117, and HLA-DR. Optionally, these cells also do not express hTERT or telomerase. In one embodiment, the cells also express CD10, CD44, and CD43. In an alternate embodiment, the cells also do not express CD45 and CD31. These UTC optionally (i) express oxidized low density lipoprotein receptor 1, reticulon, chemokine receptor ligand 3, and/or granulocyte chemotactic protein; and/or (ii) express, relative to a human fibroblast, mesenchymal stem cell, or iliac crest bone marrow cell, increased levels of interleukin 8 or reticulon 1.

In an alternate embodiment, the UTC are isolated from human umbilical cord tissue substantially free of blood, are capable of self-renewal and expansion in culture, have the potential to differentiate, and have the following characteristics: (1) express CD10, CD13, CD44, CD90, and HLA-ABC; (2) do not express CD31, CD34, CD45, HLA-DR and CD117, and (3) do not express hTERT or telomerase. In alternate embodiment, the UTC are isolated from human umbilical cord tissue substantially free of blood, are capable of self-renewal and expansion in culture, have the potential to differentiate, and have the following characteristics: (1) express CD10, CD13, CD44, CD90, and HLA-ABC; (2) do not express CD31, CD34, CD45, HLA-DR and CD117; (3) do not express hTERT or telomerase; (4) express oxidized low density lipoprotein receptor 1, reticulon, chemokine receptor ligand 3, and/or granulocyte chemotactic protein; and (4) express, relative to a human fibroblast, mesenchymal stem cell, or iliac crest bone marrow cell, increased levels of interleukin 8 or reticulon 1.

In one embodiment, the hUTC are provided as a population of cells, which may be homogenous. In some embodiments, the cell population may be heterogeneous. A heterogeneous cell population of the invention may comprise at least about 5%, 10%, 20%, 30%, 40%, 50%, 60%, 70%, 80%, 90%, or 95% UTC of the invention. The heterogeneous cell populations of the invention may further comprise stem cells or other progenitor cells, such as myoblasts or other muscle progenitor cells, hemangioblasts, or blood vessel precursor cells; or it may further comprise fully differentiated skeletal muscle cells, smooth muscle cells, pericytes, or blood vessel endothelial cells. In some embodiments, the population is substantially homogeneous, i.e., comprises substantially only the UTC (preferably at least about 96%, 97%, 98%, 99% or more UTC). The homogeneous cell populations of the invention are comprised of umbilicus-derived cells. Homogeneous populations of umbilicus-derived cells are preferably free of cells of maternal lineage. Homogeneity of a cell population may be achieved by any method known in the art, e.g., by cell sorting (e.g., flow cytometry) or by clonal expansion in accordance with known methods. Homogeneous UTC populations may comprise a clonal cell line of postpartum-derived cells.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

EXAMPLES

Example 1

Freezing Media Comparison

For use in clinical sites, human umbilical tissue cells (hUTC) need to be cryopreserved in a medium formulation be able to support high cell survivability during the cryopreservation and cell thaw steps. This example discloses a comparison between two embodiments of the cryopreservation compositions of the invention and shows that these compositions are able to support high cell survivability during the cryopreservation and cell thaw steps. Table 1-1 shows the formulation of the compositions used in this example.

TABLE 1-1

Cryopreservation Formulation Compositions

|  | Formulation "Modified I" (mg/L) | Formulation 'B' (mg/L) |
| --- | --- | --- |
| L-Arginine | 37.8 | 75.6 |
| D-calcium pantothenate | 1.8 | 3.6 |
| choline chloride | 1.8 | 3.6 |
| dextrose (anhydrous USP) | 855 | 900 |
| folic acid | 1.8 | 3.6 |
| L-Glutamine | 262.8 | 525.6 |
| Glycine | 13.5 | 27 |
| L-Isoleucine | 47.16 | 94.32 |
| L-Leucine | 47.16 | 94.32 |
| L-Lysine, HCl | 65.79 | 131.58 |
| L-Methionine | 13.5 | 27 |
| niacinamide | 1.8 | 3.6 |
| L-Phenylalanine | 29.7 | 59.4 |
| potassium chloride, USP | 432 | 360 |
| pyridoxine, HCl | 1.8 | 3.6 |
| riboflavin | 0.18 | 0.36 |
| L-Serine | 18.9 | 37.8 |
| sodium bicarbonate, USP | 2565 | 3330 |
| sodium chloride, USP | 2880 | 5760 |
| sodium phosphate (monobasic $H_2O$) | 56.25 | 112.5 |
| thiamine, HCl | 1.8 | 3.6 |
| L-Threonine | 42.75 | 85.5 |
| L-Tryptophan | 7.2 | 14.4 |
| L-Valine | 41.85 | 83.7 |
| sucrose | 3081 | 6160 |
| mannitol | 1639 | 3240 |
| calcium chloride dihydrate ($CaCl_2 \cdot 2H_2O$) | 32 or 3.2 (low calcium) | 0 |
| magnesium chloride ($MgCl_2 \cdot 6H_2O$) | 458 | 0 |
| potassium bicarbonate ($KHCO_3$) | 225 | 0 |
| potassium monophosphate ($KH_2PO_4$) | 612 | 0 |
| lactobionic acid | 16123 | 0 |
| glutathione | 415 | 0 |
| DMSO | 10% v/v | 10% v/v |

Materials and Methods:

Cell Culture hUTC were expanded in bioreactors on microcarrier beads. The beads were collected, allowed to settle and the hUTC were dissociated from the beads by enzymatic digestion. The dissociated cells were concentrated and formulated into final cryopreservation formulations at a cell concentration of $10 \times 10^6$ cells/mL. Aliquots of the cells in different formulations were withdrawn and transferred into cryovials or cryobags for cryopreservation using a controlled rate freezer (GDKRYO 750 PLUS-F-115) using the freezing profile listed in Table 1-2. After the cells were frozen, they were transferred and stored in a liquid nitrogen freezer until their use.

The freezing profile shown in Table 1-2 describes the chamber conditions for a continuous temperature decrease of the sample at 1° C./min between 4° C. and −45° C. The freezing profile needs to show such a continuous decrease around the freezing point of the cell solution where the crystallization of the solution stimulates a temperature rise. This temperature increase could affect cell viability. This risk is reduced by minimizing the super cooling and following latent heat by the program's sharp temperature drop in the cryogenic freezing chamber from −25° C./min to −50° C. Table 1-2 below, shows temperature readings from the chamber probe; these temperatures differ from the sample probe (submerged in the final freezing media). The sample probe does not experience these temperature changes.

TABLE 1-2

Freezing profiles to cryopreserve hUTC

| Step | Start Temperature (° C.) Rate (° C./min) | 4° C. End Temperature (° C.) |
|---|---|---|
| 1 | 15 min hold | |
| 2 | −1.0 | −3.0 |
| 3 | −25.0 | −50.0 |
| 4 | +10.0 | −20.0 |
| 5 | −1.0 | −45.0 |
| 6 | −10.0 | −120.0 |

Vial Thaw

The vials were removed from the liquid nitrogen storage freezer then submerged into dry ice for transportation to the experimental lab for testing. The vials were rapidly thawed in a 37° C. preheated water bath for approximately 2-3 minutes. One (1) ml of the thawed cell suspension was transferred to a centrifuge tube and 9 ml of pre-warmed growth medium (DMEM+15% FBS (v/v)) was added for a cell count. One (1) ml of the cell suspension was removed and placed into a Cedex sample cup for cell count. A Cedex cell count was then performed. The method used was trypan blue exclusion. Using the VCD, the number of viable cells and cell viability were assessed.

Results

Viable Cells Density and Viability

The results summarized in Tables 1-3 and 1-4 show that there was no significant viable cell density and viability differences of hUTC immediately after thaw for vials stored up to 24 months in liquid nitrogen freezer.

TABLE 1-3

Viable Cell Density and Viability

| | Formulation 'B' | | | Formulation 'I - Modified' low calcium | |
|---|---|---|---|---|---|
| Month | Age of Vial | Viable Cell Density/Viability | Month | Age of Vial | Viable Cell Density/Viability |
| 0 | 4 days | $10.23 \times 10^6$ cells/mL, 89.1% | 0 | 4 days | $11.56 \times 10^6$ cells/mL, 93.0% |
| 1 | 1 month | $11.5 \times 10^6$ cells/mL, 94.0% | 1 | 1 month | $11.02 \times 10^6$ cells/mL, 94.4% |
| 2 | 2 months | $12.59 \times 10^6$ cells/mL, 93.2% | 2 | 2 months | $12.66 \times 10^6$ cells/mL, 93.5% |
| 3 | 3 months | $10.78 \times 10^6$ cells/mL, 92.9% | 3 | 3 months | $11.32 \times 10^6$ cells/mL, 93.2% |
| 6 | 6 months | $10.99 \times 10^6$ cells/mL, 88.9% | 6 | 6 months | $10.64 \times 10^6$ cells/mL, 90.8% |
| 12 | 13 months | $11.46 \times 10^6$ cells/mL, 92.7% | 12 | 13 months | $12.34 \times 10^6$ cells/mL, 95.8% |
| 24 | 24 months | $9.89 \times 10^6$ cells/mL, 85.6% | 24 | 24 months | $11.07 \times 10^6$ cells/mL, 91.8% |

TABLE 1-4

Viable Cell Density and Viability

| | Formulation 'B' | | | Formulation 'I - Modified' | |
|---|---|---|---|---|---|
| Month | Age of Vial | Viable Cell Density/Viability | Month | Age of Vial | Viable Cell Density/Viability |
| 0 | 5 days | $8.69 \times 10^6$ cells/mL, 77.9% | 0 | 5 days | $10.67 \times 10^6$ cells/mL, 87.1% |
| 1 | 25 days | $10.45 \times 10^6$ cells/mL, 92.5% | 1 | 25 days | $11.02 \times 10^6$ cells/mL, 91.8% |
| 2 | 2 months | $10.25 \times 10^6$ cells/mL, 89.6% | 2 | 2 months | $10.85 \times 10^6$ cells/mL, 91.7% |
| 3 | 3 months | $10.97 \times 10^6$ cells/mL, 87.3% | 3 | 3 months | $11.67 \times 10^6$ cells/mL, 90.9% |
| 6 | 6 months | $11.53 \times 10^6$ cells/mL, 90.0% | 6 | 6 months | $10.73 \times 10^6$ cells/mL, 90.8% |
| 12 | 1 year | $12.81 \times 10^6$ cells/mL, 91.6% | 12 | 1 year, | $13.43 \times 10^6$ cells/mL, 95.0% |
| 24 | 24 months | $9.97 \times 10^6$ cells/mL, 83.7% | 24 | 24 months | $10.48 \times 10^6$ cells/mL, 87.1% |

Cell Survivability at Room Temperature after Thaw

ViaCount® on Guava® was used to evaluate the two formulations at different times upon thaw at time 0 (T0), 1 (T1), 2 (T2), 3 (T3), and 4 (T4) hours. The hUTC frozen in formulation 'I (mod)' sustained higher number of live cells after 4 hours at room temperature than the cells frozen in formulation B. The results are summarized in Table 1-5 and FIG. 1. In Table 1-5, Sample ID refers to the formulation used (formulation B or formulation 'I (mod)').

TABLE 1-5

Cell Survivability at Room Temperature in Formulations 'B' and 'I (Mod. low calcium)'

|  | Sample ID | T0 | T1 | T2 | T3 | T4 |
|---|---|---|---|---|---|---|
| Guava (Live, %) | B | 71.13 | 74.8 | 78.9 | 75.3 | 67 |
|  | I (mod, low Ca) | 80 | 82.5 | 81.4 | 83.5 | 79.9 |
| Guava (Dead, %) | B | 28.87 | 25.2 | 21.1 | 24.7 | 33 |
|  | I (mod, low Ca) | 20 | 17.5 | 18.6 | 16.5 | 20.1 |

Cell Recoverability

Cell recoverability upon thaw in T flasks was assessed from cells frozen in bags in Formulation 'B' and 'I (mod, low Ca)'. The cells were seeded in T-75 flasks at a seeding density of 5000 cells/cm². A growth medium of 85% DMEM+15% FBS (v/v) was used for testing the cell recoverability after thaw. Each day the cells were detached from the T flask surface with TrypLE and counted on CEDEX.

Figure 2:
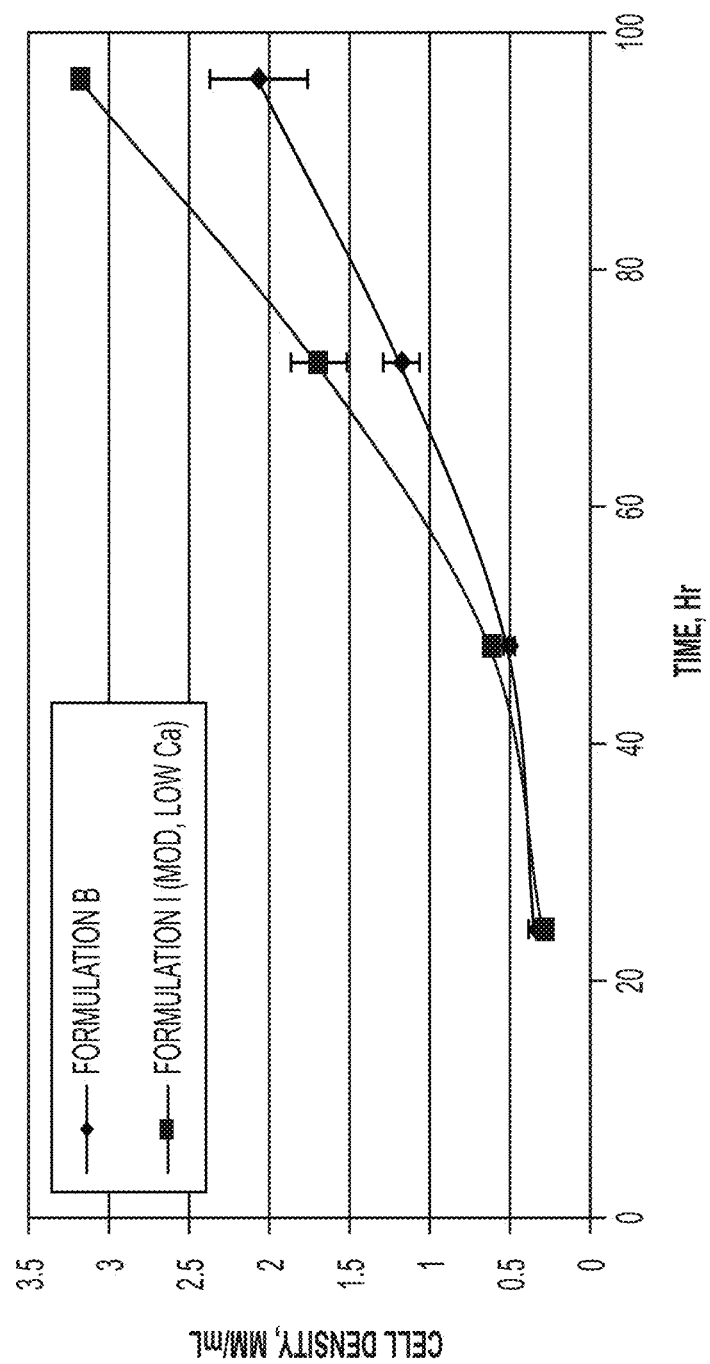
FIG. 2 shows cell recoverability upon thaw.

FIG. 2 and Table 1-6 show cell recoverability results. A better recovery trend was observed from cells frozen in formulation I (modified, low Ca) in comparison with formulation B.

TABLE 1-6

Cell recoverability upon thaw

| Formulation | Sample ID | Viability % 0 hours | Viability % 24 hours | Viability % 48 hours | Viability % 72 hours | Viability % 96 hours |
|---|---|---|---|---|---|---|
| Formulation B | Bag A-1 | 100 | 100 | 100 | 97.3 | 99.3 |
|  | Bag A-2 |  | 100 | 99.4 | 97.9 | 99.4 |
| Formulation I (modified, low Ca) | Bag B-1 | 100 | 100 | 97.8 | 99.2 | 98.1 |
|  | Bag B-2 |  | 100 | 98 | 98.6 | 100 |

| Formulation | Sample ID | Total Viable Cells (×10⁶) 0 hours | Total Viable Cells (×10⁶) 24 hours | Total Viable Cells (×10⁶) 48 hours | Total Viable Cells (×10⁶) 72 hours | Total Viable Cells (×10⁶) 96 hours |
|---|---|---|---|---|---|---|
| Formulation B | Bag A-1 | 0.375 | 0.384 | 0.54 | 1.11 | 1.87 |
|  | Bag A-2 | 0.375 | 0.314 | 0.498 | 1.27 | 2.29 |
|  | Avg. Form B | 0.375 | 0.349 | 0.519 | 1.19 | 2.08 |
| Formulation I (modified, low Ca) | Bag B-1 | 0.375 | 0.3 | 0.598 | 1.59 | 3.18 |
|  | Bag B-2 | 0.375 | 0.303 | 0.664 | 1.83 | 3.2 |
|  | Avg. Form I | 0.375 | 0.3015 | 0.631 | 1.71 | 3.19 |

Formulation Robustness

Figure 3:
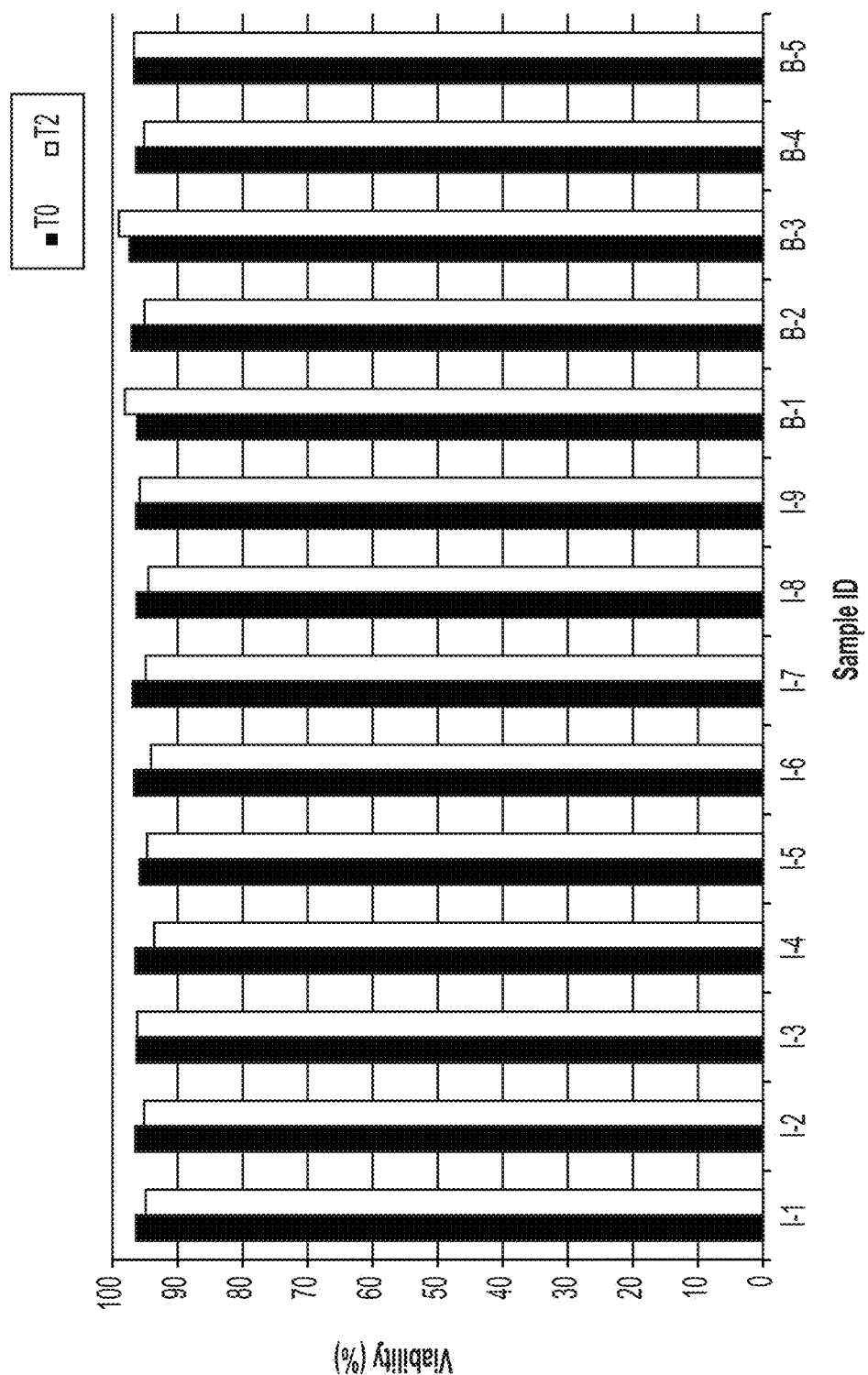
FIG. 3 shows cell viability after thaw. The data shown is based of CEDEX data using trypan blue as a stain.
Figure 4:
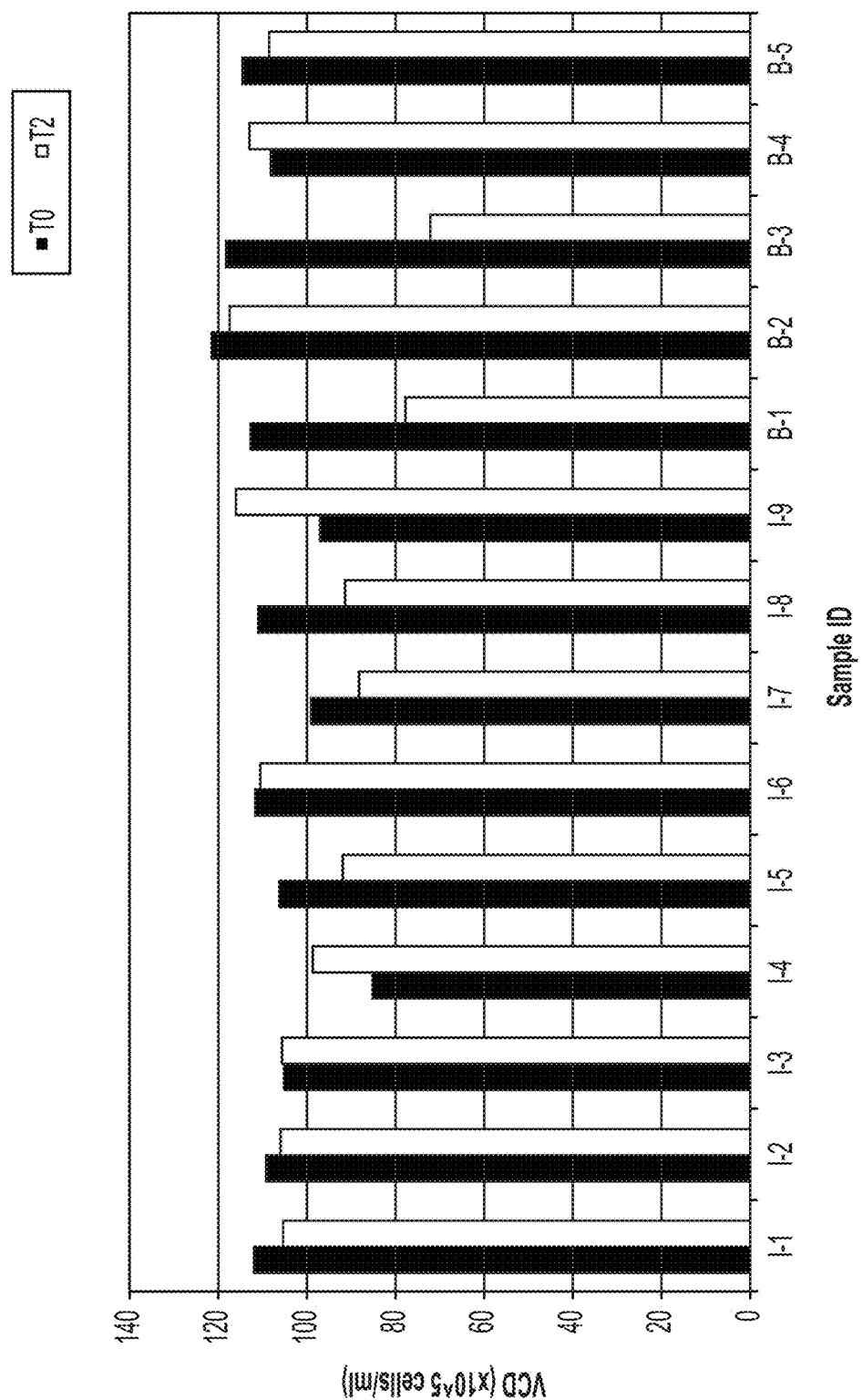
FIG. 4 shows viable cell density after thaw.

The effect of major selected components in the formulation "B" and "I (mod, low Ca)" were studied to evaluate the robustness of these cryopreservation formulations to maintain high VCD and viability of hUTC during cryopreservation. The concentration of the major cryoprotectants was tested to evaluate the effect of cryoprotectants on the cell cryopreservation (see Table 1-7 and Table 1-8 below). hUTC stored in liquid nitrogen vapor phase were thawed using standard operating procedures to measure cell viability (see Table 1-9 below and FIG. 3) and viable cell density (see Table 1-10 below and FIG. 4) immediately after thaw (T0) and 2 hours (T2) after thaw. The results from this experiment confirmed that formulations B and I maintain cell viability. The viable cell density was maintained in two hours for the tested formulations. In Tables 1-7, 1-9 and 1-10, formulation B-1 to B-5 have the composition of formulation B listed in Table 1-1 with the exception of the varying amounts of sucrose and mannitol. Furthermore, in Tables 1-8 to 1-10, formulation I-1 to I-10 have the composition of formulation modified I listed in Table 1-1 with the exception of the varying amounts of lactobionic acid, sucrose, mannitol, and glutathione.

TABLE 1-7

Concentration of major cryoprotectants in Cryopreservation Formulation B

| Formulation ID[a] | sucrose (g/L) | mannitol (g/L) |
|---|---|---|
| B-1 | 6.165 | 3.28 |
| B-2 | 4.932 | 2.62 |
| B-3 | 7.4 | 3.94 |
| B-4 | 7.4 | 2.62 |
| B-5 | 4.932 | 3.94 |

[a] concentrations stated are based on cell compositions comprising 45% of the formulations, 45% DMEM lite and 10% DMSO

TABLE 1-8

Concentration of major cryoprotectants in Cryopreservation Formulation I (mod. low Ca)

| Formulation ID[a] | Lactobionic acid (g/L) | sucrose (g/L) | mannitol (g/L) | glutathione (g/L) |
|---|---|---|---|---|
| I-1 | 12.897 | 2.46 | 1.967 | 0.495 |
| I-2 | 19.346 | 3.695 | 1.31 | 0.329 |
| I-3 | 19.346 | 2.46 | 1.31 | 0.495 |

TABLE 1-8-continued

Concentration of major cryoprotectants in Cryopreservation Formulation I (mod. low Ca)

| Formulation ID[a] | Lactobionic acid (g/L) | sucrose (g/L) | mannitol (g/L) | glutathione (g/L) |
|---|---|---|---|---|
| I-4 | 12.897 | 3.695 | 1.967 | 0.329 |
| I-5 | 19.346 | 3.695 | 1.967 | 0.495 |
| I-6 | 19.346 | 2.46 | 1.967 | 0.329 |
| I-7 | 12.897 | 3.695 | 1.31 | 0.495 |
| I-8 | 16.124 | 3.08 | 1.64 | 0.412 |
| I-9 | 12.897 | 2.46 | 1.31 | 0.329 |

[a]concentrations stated are based on cell compositions comprising 45% of the formulations, 45% DMEM lite and 10% DMSO

TABLE 1-9

Cedex viability after thaw

| | Cedex Viability | |
|---|---|---|
| Sample ID | % T0 | % T2 |
| I-1 | 96.4 | 94.9 |
| I-2 | 96.5 | 95.2 |
| I-3 | 96.3 | 96.2 |
| I-4 | 96.5 | 93.6 |
| I-5 | 95.8 | 94.7 |
| I-6 | 96.7 | 94.1 |
| I-7 | 96.9 | 94.9 |
| I-8 | 96.3 | 94.5 |
| I-9 | 96.4 | 95.8 |
| B-1 | 96.2 | 98.1 |
| B-2 | 97.1 | 95.1 |
| B-3 | 97.4 | 99 |
| B-4 | 96.4 | 95.2 |
| B-5 | 96.7 | 96.7 |

TABLE 1-10

Viable Cell Density after thaw Trypan VCD ($\times 10^5$ cells/ml)

| Sample ID | T0 | T2 |
|---|---|---|
| I-1 | 111.94 | 105.36 |
| I-2 | 109.16 | 105.98 |
| I-3 | 105.18 | 105.66 |
| I-4 | 85.22 | 98.7 |
| I-5 | 106.23 | 91.9 |
| I-6 | 111.66 | 110.54 |
| I-7 | 99.06 | 88.25 |
| I-8 | 111.04 | 91.43 |
| I-9 | 97.08 | 116.01 |
| B-1 | 112.76 | 77.82 |
| B-2 | 121.54 | 117.49 |
| B-3 | 118.27 | 72.17 |
| B-4 | 108.14 | 112.99 |
| B-5 | 114.6 | 108.56 |

Example 2

Safety of Cryopreservation Formulation in Toxicology Studies

Introduction

"Thaw and inject" cryopreservation formulations can be used as a vehicle to deliver a cell therapy product, to recipients. The use of thaw and inject formulations decreases processing of cells at the clinical site by eliminating centrifugation, washing, and cell counting steps. For a cryopreservation formulation to be used as a vehicle for direct delivery of a cell therapy product toxicology studies need to be conducted to characterize safety for specific routes of administration and identify potential adverse effects.

Toxicology studies in rats were therefore conducted in which cryopreservation solutions were evaluated as potential cell vehicles and administered by either intravenous (IV) infusion or by injection into cerebral spinal fluid via intrathecal (IT) and intra cisterna magna (ICM) routes.

Figure 5:
FIG. 5 shows edema and limb redness in rats following IV infusion of cryopreservation formulation containing a commercially available cryopreservation solution (CS10).

Edema and limb redness was observed in rats following IV infusion of cryopreservation formulation containing a commercially available cryopreservation solution (CryoStor™ CS10). CryoStor™ CS10 is a cryopreservation medium containing 10% dimethyl sulfoxide (DMSO). FIG. 5 shows a control rat on the left and a rat treated with a formulation containing CS10 on the right with edema and redness in the paws. Testing of commonly used cryopreservation solution components identified dextran as causing edema and redness in the limbs.

A. Non-Clinical Safety Evaluation of Cyropreservation Compositions and Cyropreservation Compositions Containing hUTC Following IV Infusion The purpose of this study was to evaluate the intravenous toxicity of (i) cryopreservation composition modified I (as disclosed above) and (ii) cryopreservation composition modified I with various amounts of human umbilical cord derived-tissue cells (hUTC) added.

Eighty male and 80 female Crl:CD(SD) rats were randomly assigned to 5 dose groups (Groups I through V), 16 rats per sex per group as indicated in the Study Design table below. An additional 18 male and 18 female rats, 6 per sex in Groups III through V, were assigned to confirm cell exposure portion of the study. Suspensions of the test article (hUTC in modified I), the saline control, or the vehicle (modified I) were administered via IV infusion once at doses of 0 (saline), 0 (vehicle), $3 \times 10^6$ cells, $10 \times 10^6$ cells, and $30 \times 10^6$ cells. The dose volume was 3 mL for Groups I, II and V, 0.3 mL for Group III and 1 mL for Group IV, at an infusion rate of 0.1 mL/min. The study design is summarized in Table 2-1 below. With reference to Table 2-1, the vehicle is modified I (as disclosed above in Example 1).

TABLE 2-1

Toxicology Study Design

| Dose Group | Treatment | Dose[a] (cells) | Concentration (mg/mL) | Dose Volume | Infusion Rate (minutes) | Number of Rats Per Sex |
|---|---|---|---|---|---|---|
| I | Saline Control | 0 | 0 | 3 mL | 30 | 16 |
| II | Vehicle | 0 | 0 | 3 mL | 30 | 16 |
| III | Vehicle + hUTC | $3 \times 10^6$ | $10 \times 10^6$ | 0.3 mL | 3 | 16 + 6[b] |

TABLE 2-1-continued

Toxicology Study Design

| Dose Group | Treatment | Dose[a] (cells) | Concentration (mg/mL) | Dose Volume | Infusion Rate (minutes) | Number of Rats Per Sex |
|---|---|---|---|---|---|---|
| IV | Vehicle + hUTC | $10 \times 10^6$ | $10 \times 10^6$ | 1 mL | 10 | 16 + 6[b] |
| V | Vehicle + hUTC | $30 \times 10^6$ | $10 \times 10^6$ | 3 mL | 30 | 16 + 6[b] |

[a]The test article was considered 100% active/pure for the purpose of dose calculations.
[b]Six rats assigned to the cell exposure confirmation portion of the study.

Toxicology Study Design

The vehicle+hUTC compositions were prepared by thawing cryopreserved cells at a nominal concentration of $10 \times 10^6$ cells/mL and filtering the cells through an in-line 40 µm cell filter. Cell counts and viability were determined prior to and following filtrations. The vehicle (modified I) and cells were warmed to room temperature prior to dosing and used within 45 minutes.

Checks for rat viability were made twice daily. Clinical observations were recorded before, during, and after dosing and daily during the post dose period. Body weights were recorded on the day of dose administration and at least once weekly during the post-dose period, including the day before and the day of necropsy. Feed consumption values were recorded at least once weekly and on the day before necropsy. Ophthalmological examinations were performed by a veterinary ophthalmologist for all rats prior to dose administration and within 1 week of the 28-day euthanasia.

On the day of scheduled necropsy, whole blood samples were collected from the inferior vena cava immediately following euthanasia from each rat (fasted) and processed for hematological, clinical biochemical, and immune response evaluations. Urine samples were collected for evaluation from all rats prior to necropsy. Individual organ weights were recorded for the brain, liver, heart, lungs, left kidney, and spleen and tissue samples for histopathology, and human cell specific PCR.

All rats assigned to the cell exposure portion of the study were euthanized either 1 or 24 hours after dose administration and a gross necropsy was performed. The following organs were collected using aseptic techniques for human cell specific polymerase chain reaction (PCR): brain, liver, heart, lungs, kidneys, gonads (ovaries and testis), and spleen.

Cell counts and viability were determined after pooling thawed vials of cells, after dosing formulations were prepared by filtration of thawed cell formulations through a 40 micron filter and, after completion of IV infusions. The average cell viability of the filtered dosing formulations did not change during dosing and was 89% both prior to and after completion of infusions. The average post dosing cell concentrations were 81% of the pre-dosing cell concentrations.

Results:

IV infusion of the vehicle (modified I) in a fixed volume of 3.0 mL or of hUTC in modified I ("vehicle (modified I)+hUTC) at doses as high as $30 \times 10^6$ hUTC did not cause mortality. There were no adverse clinical observations related to administration of modified I or vehicle (modified I)+hUTC in the male or female rats throughout the study.

All eye observations appeared normal in ophthalmologic examinations. There were no modified I or vehicle (modified I)+hUTC related changes in body weight, body weight gains, or feed consumption values.

There were no toxicologically significant differences between the saline control, vehicle control, and modified I or vehicle (modified I)+hUTC-treated groups in the hematology, clinical chemistry parameters, or urinalysis parameters.

At necropsy, there were no modified I or vehicle (modified I)+hUTC-related macroscopic observations or effects on organ weights. Terminal body weights and organ weights and the ratios of brain and terminal body weight to organ weights for the male and female rats were generally comparable among the dose groups. There were no histopathology findings attributed to administration of modified I or vehicle (modified I)+hUTC.

All serum samples from male and female rats from the vehicle (modified I)+hUTC-treated group contained serum antibodies directed against modified I. The serum samples from saline and modified I (vehicle) injected groups did not have detectable levels of anti-vehicle (modified I)+hUTC serum antibody. Therefore, vehicle (modified I)+hUTC induced a serum antibody response in male and female rats and is considered immunogenic in this xenogeneic (human cells into rat) model.

Exposure to vehicle (modified I)+hUTC was confirmed based on the results of the quantitative real-time polymerase chain reaction (qRT-PCR) analysis. The majority of vehicle (modified I)+hUTC was detected in the lungs shortly after IV infusion and persisted for at least 24 hours. Vehicle (modified I)+hUTC detected in the liver, spleen, and heart at 1 hour was rapidly cleared by 24 hours. No difference could be detected in the number and persistence of vehicle (modified I)+hUTC between male and female rats.

In summary, IV infusion of vehicle (modified I)+hUTC at doses as high as $30 \times 10^6$ cells or vehicle (modified I) at a fixed dose of 3.0 mL was well tolerated by male and female rats and did not cause mortality or adverse clinical observations. There were no adverse ophthalmologic effects in the eyes or on body weight, body weight gain, or feed consumption. No vehicle (modified I) or vehicle (modified I)+hUTC-related changes were observed in urinalysis, hematology or clinical chemistry parameters. Vehicle (modified I)+hUTC was found primarily in the lungs for up to 24 hours after dosing. This transient exposure was sufficient to induce antibodies to vehicle (modified I)+hUTC. There were no vehicle (modified I)+hUTC or vehicle (modified I)-related gross lesions identified at necropsy. There were no adverse effects of vehicle (modified I) or vehicle (modified I)+hUTC on terminal body weight, organ weights, or ratios of organ weights to terminal body weight or brain weight.

B. Non-Clinical Safety Evaluation of Cryopreservation Compositions Following ICM Injection The purpose of this study was to evaluate the potential toxicity of vehicle (modified I)+hUTC in rats following a single injection into the cisterna magna, to identify potential delayed toxicity, and characterize persistence and/or reversibility of possible adverse effects during a 4-week observation period. Sprague-Dawley rats (15/sex/group) were administered vehicle (modified I)+hUTC at nominal doses of $1\times10^6$ or $3\times10^6$ cells, and control rats were administered either 0.9% saline or vehicle (modified I). On study day ("SD") 4 and 29, necropsy was performed to identify potential acute effects associated with administration of vehicle (modified I)+hUTC and vehicles, and resolution, respectively. Additional (satellite) animals were included in the study to confirm exposure to vehicle (modified I)+hUTC and to evaluate potential persistence.

Vials of vehicle (modified I)+hUTC were thawed and used without filtration. At the low dose, the dosing formulations were either used without dilution or were diluted in the vehicle (modified I) when the cell concentration exceeded the $10\pm3\times10^6$ specification. For administration, the high dose cells were concentrated by centrifugation and resuspended in modified I in slightly less than one third of the original volume. Cell counts and viability were determined following concentration and the volume was then adjusted to a cell concentration of $30\times10^6$ cells/mL by addition of modified I. The average cell viability of the dosing formulations was 89% prior to dosing and 78% following administration. The study design is detailed in ICM. The study design is summarized in Table 2-2 below:

could be detected in blood, brain, or spinal cord tissue samples obtained on study day (SD) 29.

Vehicle (modified I)+hUTC was immunogenic based on results from serum analysis that revealed the presence of an antibody response to vehicle (modified I)+hUTC on SD 29 in rats administered vehicle (modified I)+hUTC at both dose levels. All pre-study serum samples and samples obtained from saline and vehicle control (modified I-treated) animals on study days (SD) 4 and 29 did not contain serum antibodies to modified I.

Postmortem there were no vehicle (modified I) or vehicle (modified I)+hUTC-related organ weight changes or gross pathology observations at necropsy. However, histopathology revealed vehicle (modified I)+hUTC-related findings in the in the meninges of the brain and spinal cord (cervical, thoracic and lumbar) at both nominal doses of vehicle (modified I)+hUTC. The microscopic findings were noted in rats euthanized on study days (SD) 4 and 29 were described as minimal to slight meningeal inflammatory infiltrates, characterized by the presence or accumulation of mononuclear cells in the meninges, which were found around small blood vessels. Focal areas of meningeal thickening were also noted.

In summary, a single injection of vehicle (modified I)+hUTC into the cisterna magna was not associated with mortality, clinical signs of toxicity, or adverse effects on clinical pathology parameters or neurobehavioral evalua-

TABLE 2-2

ICM Toxicity Study Design

| Group Number/Identification | Dose (Number of Cells)[c] | Dose Volume (μL) | Toxicity Animals[a] | | Satellite Animals[b] | |
|---|---|---|---|---|---|---|
| | | | Number of Males | Number of Females | Number of Males | Number of Females |
| 1/0.9% sodium chloride Injection, USP | 0 | 100 | 15 | 15 | 3 | 3 |
| 2/Vehicle (modified I) | 0 | 100 | 15 | 15 | 3 | 3 |
| 3/Vehicle + hUTC (low concentration) | $1.0 \times 10^6$ | 100 | 15 | 15 | 12 | 12 |
| 4/Vehicle + hUTC (high concentration) | $3.0 \times 10^6$ | 100 | 15 | 15 | 12 | 12 |

[a] 5 animals/sex/group with a necropsy on Day 4 (Main Toxicity Animals) and 10 animals/sex/group with a necropsy on Day 29 (Recovery Toxicity Animals);
[b] For evaluation of cell exposure by Polymerase Chain Reaction (PCR) 3 animals/sex/Groups 1 and 2 euthanized on Day 1 and 4 animals/sex/Groups 3 and 4 euthanized respectively on Day 1 (cell exposure confirmation), Days 4 and 29 (for the PCR assessment of Vehicle + hUTC tissue biodistribution);
[c] Targeted number of cells There were no vehicle (modified) or vehicle (modified I)+hUTC-related mortality or changes in clinical signs with the exception of higher incidence of discharge from the cranial skin lesions at the high dose of vehicle (modified I)+hUTC. There were no vehicle (modified I) or vehicle (modified I)+hUTC-related changes in body weight parameters, food consumption, neurobehavioral functional observation battery evaluations, ophthalmic examinations, hematology, clinical chemistry, or urinalysis parameters.

Polymerase Chain Reaction (PCR) analysis confirmed the presence of human cells and exposure to vehicle (modified I)+hUTC in cerebrospinal fluid samples obtained upon completion of dosing. Study day (SD) 4, human cells were detected in the brain, and in the cervical, thoracic, and lumbar regions of the spinal cord. The greatest number of cells was found in the brain but less than 3% of the administered dose was detected in the brain and spinal cord and no cells were detected in the blood. No human cells tions. Antibodies to vehicle (modified I)+hUTC developed and persistent inflammatory infiltrates of mononuclear cells were observed in the meninges with focal areas of meningeal thickening observed at doses $\geq1\times10^6$ cells. The immune antibody response and meningeal observations may represent humoral and cellular responses to xenogeneic human cells by the rat.

Example 3

Reduced DMSO FBC/DMEM-Lite

Direct administration of a thawed suspension of cells is suitable for many applications including systemic administration. Evidence has demonstrated a formulation containing 10% v/v DMSO supported cell viability during cryopreservation and post thaw. DMSO is an important cryoprotectant and has been used in many cryopreservation applications for cells and tissues in therapeutic indications. A formulation has been defined that supports hUTC viability and activity. This formulation contained a relatively high density of hUTC (10 million per milliliter) with a concentration of DMSO at 10% (v/v), allowed for a high dose of cells to be administered intravenously, and proved to be effective in reducing the damage from an ischemic cerebral injury.

The 10% DMSO formulation is suitable for cell administration for many applications including those for which cells are administered intravenously. However, in some applications, a reduced amount of DMSO may be more desirable when the cells are administered into some biological compartments, such as within the CNS. Some compartments have unique structures and properties that may be more sensitive to DMSO or may limit DMSO diffusion and as a consequence the tissues in those areas may be exposed to levels of DMSO that may induce some adverse reactions.

In anticipation of using hUTC for additional indications that may require administration into discreet and smaller compartments a series of in vitro studies was performed to determine if the cryopreservation formulations (e.g. Modified I-based formulations as disclosed in Example 1 above) with lower DMSO concentrations would support hUTC viability and recovery through cryopreservation and stability post-thaw. Cells were tested in an array of solutions with varying levels of DMSO and cell concentrations.

Methods hUTC were expanded in bioreactors on microcarrier beads. The microcarrier beads were collected by allowing to settle and the hUTC were dissociated from the beads by enzymatic digestion. The dissociated cells were collected by centrifugation and washed with saline solution. Cells were distributed into 9 total formulations as outlined in Table 3-1 below. Aliquots of these suspensions were withdrawn and transferred into 1 mL vials for cryopreservation. Samples were stored at room temperature for approximately 60 minutes then frozen in a controlled rate freezer. Frozen samples were then transferred and stored in a liquid nitrogen dewar.

Table 3-1 shows the cryopreservation formulations evaluated in this study. Formulations were based on FBC/DMEM-lite formulations and then DMSO added at appropriate concentration. Solutions were designated by the letters in the first column.

TABLE 3-1

Cryopreservation formulations evaluated

| # | [Cell] (M/mL) | [DMSO] (% v/v) |
|---|---|---|
| A | 10 | 10 |
| B | 10 | 7 |
| C | 10 | 5 |
| D | 10 | 2 |
| E | 7 | 5 |
| F | 7 | 2 |
| G | 5 | 2 |
| H | 20 | 10 |
| I | 30 | 10 |

Sample vials were removed from storage and thawed rapidly in a water bath. Aliquots were removed and recovery and viability was determined with the Guava® Viacount® and instrument. The vials were held at room temperature and additional aliquots were removed at 15 to 20 minute intervals and recovery and viability were measured with the Guava® instrument. The times of the aliquots were removed were recorded and the recovery and viability values were plotted over time.

Figure 6A:
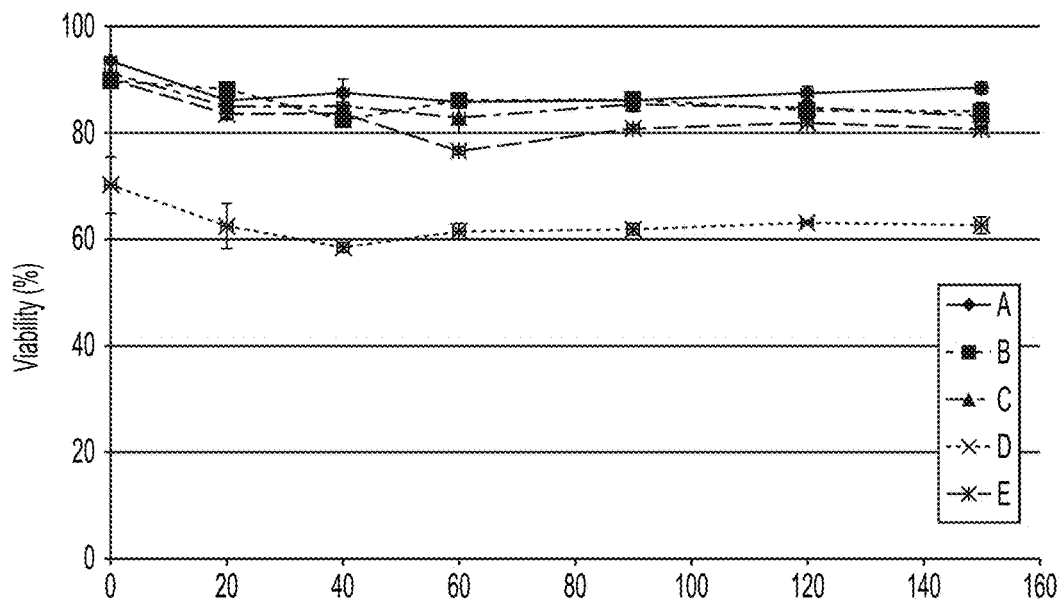
FIGS. 6A and 6B show the viability of hUTC in multiple formulations post thaw. Cells were thawed and aliquots withdrawn and viability measured with Guava® Viacount® over time. Samples were measured in triplicate and results plotted as mean±SEM.
Figure 6B:
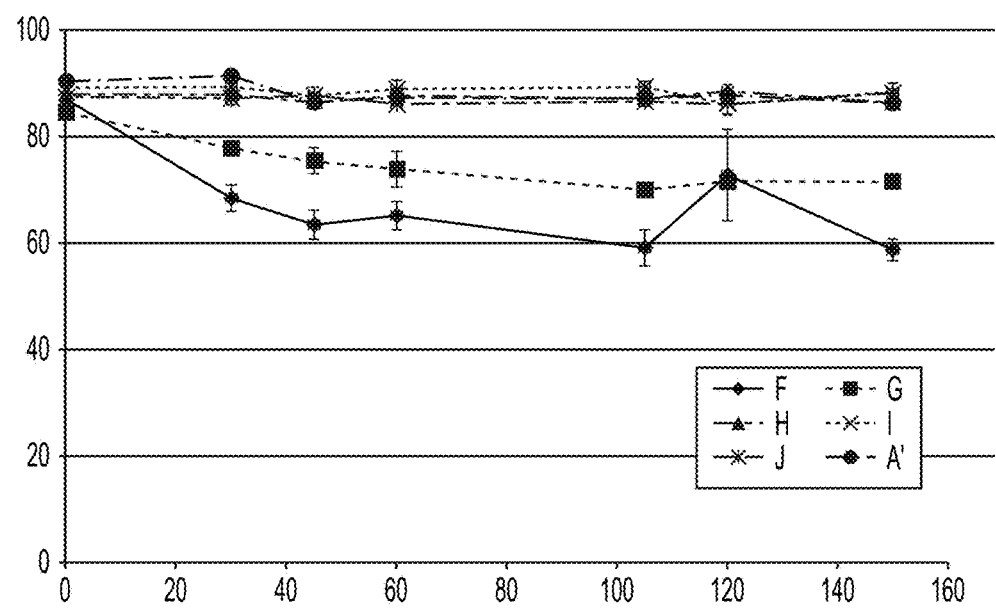

Viability and recovery results show that the formulations supported cell viability through cryopreservation and maintained viability post thaw. Results are shown in FIG. 6A and FIG. 6B. Results show that not all formulations supported hUTC viability equally. The viability for cells formulated in solutions that contained 10%, 7%, and 5% DMSO were similar. The lowest viabilities were observed with 2% DMSO. These results demonstrate the importance of DMSO as a cryoprotectant.

Example 4

Isolation of Cells

Umbilical Cell Isolation.

Umbilical cords were obtained from National Disease Research Interchange (NDRI, Philadelphia, Pa.). The tissues were obtained following normal deliveries. The cell isolation protocols were performed aseptically in a laminar flow hood. To remove blood and debris, the cord was washed in phosphate buffered saline (PBS; Invitrogen, Carlsbad, Calif.) in the presence of penicillin at 100 U/ml, streptomycin at 100 mg/ml and amphotericin B at 0.25 µg/ml (Invitrogen Carlsbad, Calif.). The tissues were then mechanically dissociated in 150 cm$^2$ tissue culture plates in the presence of 50 ml of medium (DMEM-low glucose or DMEM-high glucose; Invitrogen) until the tissue was minced into a fine pulp. The chopped tissues were transferred to 50 ml conical tubes (approximately 5 g of tissue per tube).

The tissue was then digested in either DMEM-low glucose medium or DMEM-high glucose medium, each containing penicillin at 100 U/ml, streptomycin at 100 mg/ml, amphotericin B at 0.25 µg/ml and the digestion enzymes. In some experiments an enzyme mixture of collagenase and dispase was used ("C:D") (collagenase (Sigma, St Louis, Mo.), 500 U/ml; and dispase (Invitrogen), 50 U/ml, in DMEM-Low glucose medium). In other experiments a mixture of collagenase, dispase and hyaluronidase ("C:D:H") was used (C:D:H=collagenase, 500 U/ml; dispase, 50 U/ml; and hyaluronidase (Sigma), 5 U/ml, in DMEM-Low glucose). The conical tubes containing the tissue, medium and digestion enzymes were incubated at 37° C. in an orbital shaker (Environ, Brooklyn, N.Y.) at 225 rpm for 2 hours.

After digestion, the tissues were centrifuged at 150×g for 5 minutes, the supernatant was aspirated. The pellet was resuspended in 20 ml of growth medium (DMEM:Low glucose (Invitrogen), 15% (v/v) fetal bovine serum (FBS; defined fetal bovine serum; Lot #AND18475; Hyclone, Logan, Utah), 0.001% (v/v) 2-mercaptoethanol (Sigma), penicillin at 100 U/ml, streptomycin at 100 µg/ml, and amphotericin B at 0.25 µg/ml (each from Invitrogen, Carlsbad, Calif.)). The cell suspension was filtered through a 70 µm nylon BD FALCON Cell Strainer (BD Biosciences, San Jose, Calif.). An additional 5 ml rinse comprising growth medium was passed through the strainer. The cell suspension was then passed through a 40-µm nylon cell strainer (BD Biosciences, San Jose, Calif.) and chased with a rinse of an additional 5 ml of growth medium.

The filtrate was resuspended in growth medium (total volume 50 ml) and centrifuged at 150×g for 5 minutes. The supernatant was aspirated and the cells were resuspended in 50 ml of fresh growth medium. This process was repeated twice more.

After the final centrifugation, supernatant was aspirated and the cell pellet was resuspended in 5 ml of fresh growth medium. The number of viable cells was determined using trypan blue staining. Cells were then cultured under standard conditions.

The cells isolated from umbilical cord tissues were seeded at 5,000 cells/cm² onto gelatin-coated T-75 flasks (Corning Inc., Corning, N.Y.) in growth medium. After two days, spent medium and unadhered cells were aspirated from the flasks. Adherent cells were washed with PBS three times to remove debris and blood-derived cells. Cells were then replenished with growth medium and allowed to grow to confluence (about 10 days from passage 0 to passage 1). On subsequent passages (from passage 1 to 2 etc.), cells reached sub-confluence (75-85% confluence) in 4-5 days. For these subsequent passages, cells were seeded at 5,000 cells/cm². Cells were grown in a humidified incubator with 5% carbon dioxide at 37° C.

In some experiments, cells were isolated from postpartum tissues in DMEM-low glucose medium after digestion with LIBERASE (2.5 mg/ml, Blendzyme 3; Roche Applied Sciences, Indianapolis, Ind.) and hyaluronidase (5 U/ml, Sigma). Digestion of the tissue and isolation of the cells was as described for other protease digestions above, however, the LIBERASE/hyaluronidase mixture was used instead of the C:D or C:D:H enzyme mixture. Tissue digestion with LIBERASE resulted in the isolation of cell populations from postpartum tissues that expanded readily.

Procedures were compared for isolating cells from the umbilical cord using differing enzyme combinations. Enzymes compared for digestion included: i) collagenase; ii) dispase; iii) hyaluronidase; iv) collagenase:dispase mixture (C:D); v) collagenase:hyaluronidase mixture (C:H); vi) dispase:hyaluronidase mixture (D:H); and vii) collagenase:dispase:hyaluronidase mixture (C:D:H). Differences in cell isolation utilizing these different enzyme digestion conditions were observed (see Table 4-1).

Other attempts were made to isolate pools of cells from umbilical cord by different approaches. In one instance, umbilical cord was sliced and washed with growth medium to dislodge the blood clots and gelatinous material. The mixture of blood, gelatinous material and growth medium was collected and centrifuged at 150×g. The pellet was resuspended and seeded onto gelatin coated flasks in growth medium. From these experiments a cell population was isolated that readily expanded.

Cells have also been isolated from cord blood samples obtained from NDRI. The isolation protocol used was that of International Patent Application PCT/US2002/029971 by Ho et al. Samples (50 ml and 10.5 ml, respectively) of umbilical cord blood (NDRI, Philadelphia Pa.) were mixed with lysis buffer (filter-sterilized 155 mM ammonium chloride, 10 millimolar potassium bicarbonate, 0.1 mM EDTA buffered to pH 7.2 (all components from Sigma, St. Louis, Mo.)). Cells were lysed at a ratio of 1:20 cord blood to lysis buffer. The resulting cell suspension was vortexed for 5 seconds, and incubated for 2 minutes at ambient temperature. The lysate was centrifuged (10 minutes at 200×g). The cell pellet was resuspended in Complete Minimal Essential Medium (Gibco, Carlsbad Calif.) containing 10% fetal bovine serum (Hyclone, Logan Utah), 4 mM glutamine (Mediatech Herndon, Va.), penicillin at 100 U/ml and streptomycin at 100 µg/ml (Gibco, Carlsbad, Calif.). The resuspended cells were centrifuged (10 minutes at 200×g), the supernatant was aspirated, and the cell pellet was washed in complete medium. Cells were seeded directly into either T75 flasks (Corning, N.Y.), T75 laminin-coated flasks, or T175 fibronectin-coated flasks (both Becton Dickinson, Bedford, Mass.).

To determine whether cell populations could be isolated under different conditions and expanded under a variety of conditions immediately after isolation, cells were digested in growth medium with or without 0.001% (v/v) 2-mercaptoethanol (Sigma, St. Louis, Mo.), using the enzyme combination of C:D:H, according to the procedures provided above. All cells were grown in the presence of penicillin at 100 U/ml and streptomycin at 100 µg/ml. Under all tested conditions cells attached and expanded well between passage 0 and 1 (Table 4-2). Cells in conditions 5-8 and 13-16 were demonstrated to proliferate well up to 4 passages after seeding, at which point they were cryopreserved.

The combination of C:D:H, provided the best cell yield following isolation, and generated cells that expanded for many more generations in culture than the other conditions (Table 4-1). An expandable cell population was not attained using collagenase or hyaluronidase alone. No attempt was made to determine if this result is specific to the collagenase that was tested.

TABLE 4-1

Isolation of cells from umbilical cord tissue using varying enzyme combinations

| Enzyme Digest | Cells Isolated | Cell Expansion |
|---|---|---|
| Collagenase | X | X |
| Dispase | + (>10 h) | + |
| Hyaluronidase | X | X |
| Collagenase:Dispase | ++ (<3 h) | ++ |
| Collagenase:Hyaluronidase | ++ (<3 h) | + |
| Dispase:Hyaluronidase | + (>10 h) | + |
| Collagenase:Dispase:Hyaluronidase | +++ (<3 h) | +++ |

Key: + = good,
++ = very good,
+++ = excellent,
X = no success

Cells attached and expanded well between passage 0 and 1 under all conditions tested for enzyme digestion and growth (Table 4-2). Cells in experimental conditions 5-8 and 13-16 proliferated well up to four passages after seeding, at which point they were cryopreserved. All cells were cryopreserved for further analysis.

TABLE 4-2

Isolation and culture expansion of postpartum cells under varying conditions

| Condition | Medium | 15% FBS | BME | Gelatin | 20% $O_2$ | Growth Factors |
|---|---|---|---|---|---|---|
| 1 | DMEM-Lg | Y | Y | Y | Y | N |
| 2 | DMEM-Lg | Y | Y | Y | N (5%) | N |
| 3 | DMEM-Lg | Y | Y | N | Y | N |
| 4 | DMEM-Lg | Y | Y | N | N (5%) | N |
| 5 | DMEM-Lg | N (2%) | Y | N (Laminin) | Y | EGF/FGF (20 ng/ml) |

TABLE 4-2-continued

Isolation and culture expansion of postpartum cells under varying conditions

| Condition | Medium | 15% FBS | BME | Gelatin | 20% O$_2$ | Growth Factors |
|---|---|---|---|---|---|---|
| 6 | DMEM-Lg | N (2%) | Y | N (Laminin) | N (5%) | EGF/FGF (20 ng/ml) |
| 7 | DMEM-Lg | N (2%) | Y | N (Fibronectin) | Y | PDGF/VEGF |
| 8 | DMEM-Lg | N (2%) | Y | N (Fibronectin) | N (5%) | PDGF/VEGF |
| 9 | DMEM-Lg | Y | N | Y | Y | N |
| 10 | DMEM-Lg | Y | N | Y | N (5%) | N |
| 11 | DMEM-Lg | Y | N | N | Y | N |
| 12 | DMEM-Lg | Y | N | N | N (5%) | N |
| 13 | DMEM-Lg | N (2%) | N | N (Laminin) | Y | EGF/FGF (20 ng/ml) |
| 14 | DMEM-Lg | N (2%) | N | N (Laminin) | N (5%) | EGF/FGF (20 ng/ml) |
| 15 | DMEM-Lg | N (2%) | N | N (Fibronectin) | Y | PDGF/VEGF |
| 16 | DMEM-Lg | N (2%) | N | N (Fibronectin) | N (5%) | PDGF/VEGF |

Nucleated cells attached and grew rapidly. These cells were analyzed by flow cytometry and were similar to cells obtained by enzyme digestion.

The preparations contained red blood cells and platelets. No nucleated cells attached and divided during the first 3 weeks. The medium was changed 3 weeks after seeding and no cells were observed to attach and grow.

Populations of cells could be isolated from umbilical tissue efficiently using the enzyme combination collagenase (a metalloprotease), dispase (neutral protease) and hyaluronidase (mucolytic enzyme which breaks down hyaluronic acid). LIBERASE, which is a blend of collagenase and a neutral protease, may also be used. Blendzyme 3, which is collagenase (4 Wunsch U/g) and thermolysin (1714 casein U/g), was also used together with hyaluronidase to isolate cells. These cells expanded readily over many passages when cultured in growth expansion medium on gelatin coated plastic.

Cells were also isolated from residual blood in the cords, but not cord blood. The presence of cells in blood clots washed from the tissue, which adhere and grow under the conditions used, may be due to cells being released during the dissection process.

Example 5

Karyotype Analysis of Cells

Cell lines used in cell therapy are preferably homogeneous and free from any contaminating cell type. Human cells used in cell therapy should have a normal number (46) of chromosomes with normal structure. To identify umbilicus-derived cell lines that are homogeneous and free from cells of non-umbilical tissue origin, karyotypes of cell samples were analyzed.

UTC from postpartum tissue of a male neonate were cultured in growth media. Postpartum tissue from a male neonate (X,Y) was selected to allow distinction between neonatal-derived cells and maternal derived cells (X,X). Cells were seeded at 5,000 cells per square centimeter in growth medium in a T25 flask (Corning, Corning, N.Y.) and expanded to 80% confluence. A T25 flask containing cells was filled to the neck with growth media. Samples were delivered to a clinical cytogenetics lab by courier (estimated lab to lab transport time is one hour). Chromosome analysis was performed by the Center for Human & Molecular Genetics at the New Jersey Medical School, Newark, N.J. Cells were analyzed during metaphase when the chromosomes are best visualized. Of twenty cells in metaphase counted, five were analyzed for normal homogeneous karyotype number (two). A cell sample was characterized as homogeneous if two karyotypes were observed. A cell sample was characterized as heterogeneous if more than two karyotypes were observed. Additional metaphase cells were counted and analyzed when a heterogeneous karyotype number (four) was identified.

All cell samples sent for chromosome analysis were interpreted by the cytogenetics laboratory staff as exhibiting a normal appearance. Three of the sixteen cell lines analyzed exhibited a heterogeneous phenotype (XX and XY) indicating the presence of cells derived from both neonatal and maternal origins (Table 5-1). Each of the cell samples was characterized as homogeneous. (Table 5-1).

TABLE 5-1

Karyotype results of hUTC

| Tissue | Passage | Metaphase cells counted | Metaphase cells analyzed | Number of karyotypes | ISCN Karyotype |
|---|---|---|---|---|---|
| Umbilical | 23 | 20 | 5 | 2 | 46, XX |
| Umbilical | 6 | 20 | 5 | 2 | 46, XY |
| Umbilical | 3 | 20 | 5 | 2 | 46, XX |

Chromosome analysis identified umbilicus-derived UTC whose karyotypes appear normal as interpreted by a clinical cytogenetic laboratory. Karyotype analysis also identified cell lines free from maternal cells, as determined by homogeneous karyotype.

Example 6

Flow Cytometric Evaluation of Cell Surface Markers

Characterization of cell surface proteins or "markers" by flow cytometry can be used to determine a cell line's identity. The consistency of expression can be determined from multiple donors, and in cells exposed to different processing and culturing conditions. Postpartum cell lines isolated from the umbilicus were characterized by flow cytometry, providing a profile for the identification of these cell lines.

Cells were cultured in growth medium, in plasma-treated T75, T150, and T225 tissue culture flasks (Corning, Corning, N.Y.) until confluent. The growth surfaces of the flasks were coated with gelatin by incubating 2% (w/v) gelatin (Sigma, St. Louis, Mo.) for 20 minutes at room temperature.

Adherent cells in flasks were washed in phosphate buffered saline (PBS); (Gibco, Carlsbad, Mo.) and detached with trypsin/EDTA (Gibco). Cells were harvested, centrifuged, and resuspended in 3% (v/v) FBS in PBS at a cell concentration of $1 \times 10^7$/ml. In accordance with the manufacture's specifications, antibody to the cell surface marker of interest (see below) was added to 100 µl of cell suspension and the mixture was incubated in the dark for 30 minutes at 4° C. After incubation, cells were washed with PBS and centrifuged to remove unbound antibody. Cells were resuspended in 500 µl PBS and analyzed by flow cytometry. Flow cytometry analysis was performed with a FACSCalibur™ instrument (Becton Dickinson, San Jose, Calif.).

The antibodies to cell surface markers shown in Table 6-1 were used.

TABLE 6-1

Antibodies used in characterizing cell surface markers of UDCs.

| Antibody | Manufacturer | Catalog Number |
| --- | --- | --- |
| CD10 | BD Pharmingen (San Diego, CA) | 555375 |
| CD13 | BD Pharmingen | 555394 |
| CD31 | BD Pharmingen | 555446 |
| CD34 | BD Pharmingen | 555821 |
| CD44 | BD Pharmingen | 555478 |
| CD45RA | BD Pharmingen | 555489 |
| CD73 | BD Pharmingen | 550257 |
| CD90 | BD Pharmingen | 555596 |
| CD117 | BD Pharmingen | 340529 |
| CD141 | BD Pharmingen | 559781 |
| PDGFr-alpha | BD Pharmingen | 556002 |
| HLA-A, B, C | BD Pharmingen | 555553 |
| HLA-DR, DP, DQ | BD Pharmingen | 555558 |
| IgG-FITC | Sigma (St. Louis, MO) | F-6522 |
| IgG-PE | Sigma | P-4685 |

Umbilicus-derived cells were analyzed at passages 8, 15, and 20.

To compare differences among donors, umbilical cord tissue-derived cells from different donors were compared to each other. Umbilicus-derived cells cultured on gelatin-coated flasks were also compared to umbilicus-derived cells cultured on uncoated flasks.

Four treatments used for isolation and preparation of cells were compared. Cells derived from postpartum tissue by treatment with: 1) collagenase; 2) collagenase/dispase; 3) collagenase/hyaluronidase; and 4) collagenase/hyaluronidase/dispase were compared.

Umbilical cord-derived cells at passage 8, 15, and 20 analyzed by flow cytometry all expressed CD10, CD13, CD44, CD73, CD 90, PDGFr-alpha and HLA-A, B, C, indicated by increased fluorescence relative to the IgG control. These cells were negative for CD31, CD34, CD45, CD117, CD141, and HLA-DR, DP, DQ, indicated by fluorescence values consistent with the IgG control.

Umbilical cord-derived cells isolated from separate donors analyzed by flow cytometry each showed positive for the production of CD10, CD13, CD44, CD73, CD90, PDGFr-alpha and HLA-A, B, C, reflected in the increased values of fluorescence relative to the IgG control. These cells were negative for the production of CD31, CD34, CD45, CD117, CD141, and HLA-DR, DP, DQ with fluorescence values consistent with the IgG control.

The umbilical cord-derived cells expanded on gelatin-coated and uncoated flasks analyzed by flow cytometry were all positive for the production of CD10, CD13, CD44, CD73, CD 90, PDGFr-alpha and HLA-A, B, C, with increased values of fluorescence relative to the IgG control. These cells were negative for the production of CD31, CD34, CD45, CD117, CD141, and HLA-DR, DP, DQ, with fluorescence values consistent with the IgG control.

Analysis of umbilical cord-derived cells by flow cytometry has established an identity of these cell lines. These umbilical cord-derived cells are positive for CD10, CD13, CD44, CD73, CD90, PDGFr-alpha, and HLA-A, B, C; and negative for CD31, CD34, CD45, CD117, CD141 and HLA-DR, DP, DQ. This identity was consistent between variations in variables including the donor, passage, culture vessel surface coating, digestion enzymes, and placental layer. Some variation in individual fluorescence value histogram curve means and ranges were observed, but all positive curves under all conditions tested were normal and expressed fluorescence values greater than the IgG control, thus confirming that the cells comprise a homogeneous population, which has positive expression of the markers.

Example 7

Analysis of Cells by Oligonucleotide Array

Oligonucleotide arrays were used to compare gene expression profiles of umbilicus-derived and placenta-derived cells with fibroblasts, human mesenchymal stem cells, and another cell line derived from human bone marrow. This analysis provided a characterization of the postpartum-derived cells and identified unique molecular markers for these cells.

Postpartum tissue-derived cells. Human umbilical cords and placenta were obtained from National Disease Research Interchange (NDRI, Philadelphia, Pa.) from normal full term deliveries with patient consent. The tissues were received and cells were isolated as described in Example 5 after digestion with a C:D:H mixture. The cells were cultured in growth medium on gelatin-coated plastic tissue culture flasks. The cultures were incubated at 37° C. with 5% $CO_2$.

Fibroblasts.

Human dermal fibroblasts were purchased from Cambrex Incorporated (Walkersville, Md.; Lot number 9F0844) and ATCC CRL-1501 (CCD39SK). Both lines were cultured in DMEM/F12 medium (Invitrogen, Carlsbad, Calif.) with 10% (v/v) fetal bovine serum (Hyclone) and penicillin/streptomycin (Invitrogen)). The cells were grown on standard tissue-treated plastic.

Human Mesenchymal Stem Cells (hMSC).

hMSCs were purchased from Cambrex Incorporated (Walkersville, Md.; Lot numbers 2F1655, 2F1656 and 2F1657) and cultured according to the manufacturer's specifications in MSCGM Media (Cambrex). The cells were grown on standard tissue cultured plastic at 37° C. with 5% $CO_2$.

Human Iliac Crest Bone Marrow Cells (ICBM). Human iliac crest bone marrow was received from NDRI with patient consent. The marrow was processed according to the method outlined by Ho, et al. (WO03/025149). The marrow was mixed with lysis buffer (155 mM $NH_4Cl$, 10 mM $KHCO_3$, and 0.1 mM EDTA, pH 7.2) at a ratio of 1 part bone marrow to 20 parts lysis buffer. The cell suspension was vortexed, incubated for 2 minutes at ambient temperature, and centrifuged for 10 minutes at 500×g. The supernatant was discarded and the cell pellet was resuspended in Minimal Essential Medium-alpha (Invitrogen) supplemented with 10% (v/v) fetal bovine serum and 4 mM glutamine. The cells were centrifuged again and the cell pellet was resuspended in fresh medium. The viable mononuclear cells were counted using trypan blue exclusion (Sigma, St. Louis, Mo.). The mononuclear cells were seeded in plastic tissue culture flasks at $5\times10^4$ cells/cm$^2$. The cells were incubated at 37° C. with 5% $CO_2$ at either standard atmospheric $O_2$ or at 5% $O_2$. Cells were cultured for 5 days without a media change. Media and non-adherent cells were removed after 5 days of culturing. The adherent cells were maintained in culture.

Actively growing cultures of cells were removed from the flasks with a cell scraper in cold phosphate buffered saline (PBS). The cells were centrifuged for 5 minutes at 300×g. The supernatant was removed and the cells were resuspended in fresh PBS and centrifuged again. The supernatant was removed and the cell pellet was immediately frozen and stored at −80° C. Cellular mRNA was extracted and transcribed into cDNA. The cDNA was then transcribed into cRNA and biotin-labeled. The biotin-labeled cRNA was hybridized with Affymetrix GENECHIP HG-U133A oligonucleotide arrays (Affymetrix, Santa Clara, Calif.). The hybridizations and data collection were performed according to the manufacturer's specifications. Data analysis was performed using "Significance Analysis of Microarrays" (SAM) version 1.21 computer software (Tusher, V. G. et al., 2001, Proc. Natl. Acad. Sci. USA 98: 5116-5121). Licenses for the analysis software are available through the Office of Technology Licensing, Stanford University, and more information is available on the World Wide Web at Professor Tibshirani's web site in the Dep't of Statistics, Stanford University.

Fourteen different populations of cells were analyzed in this study. The cells, along with passage information, culture substrate, and culture media are listed in Table 7-1. The cells lines are listed by their identification code along with passage at the time of analysis, cell growth substrate, and growth media.

TABLE 7-1

Cells analyzed by the microarray study.

| Cell Population | Passage | Substrate | Media |
|---|---|---|---|
| Umbilical (022803) | 2 | Gelatin | DMEM, 15% FBS, 2-BME |
| Umbilical (042103) | 3 | Gelatin | DMEM, 15% FBS, 2-BME |
| Umbilical (071003) | 4 | Gelatin | DMEM, 15% FBS, 2-BME |
| Placenta (042203) | 12 | Gelatin | DMEM, 15% FBS, 2-BME |
| Placenta (042903) | 4 | Gelatin | DMEM, 15% FBS, 2-BME |
| Placenta (071003) | 3 | Gelatin | DMEM, 15% FBS, 2-BME |
| ICBM (070203) (5% $O_2$) | 3 | Plastic | MEM 10% FBS |
| ICBM (062703) (std. $O_2$) | 5 | Plastic | MEM 10% FBS |
| ICBM (062703)(5% $O_2$) | 5 | Plastic | MEM 10% FBS |
| hMSC (Lot 2F1655) | 3 | Plastic | MSCGM |
| hMSC (Lot 2F1656) | 3 | Plastic | MSCGM |
| hMSC (Lot 2F1657) | 3 | Plastic | MSCGM |
| hFibroblast (9F0844) | 9 | Plastic | DMEM-F12, 10% FBS |
| hFibroblast (CCD39SK) | 4 | Plastic | DMEM-F12, 10% FBS |

The data were evaluated by principle component analysis with SAM software as described above. The analysis revealed 290 genes that were expressed in different relative amounts in the cells tested. This analysis provided relative comparisons between the populations.

Table 7-2 shows the Euclidean distances that were calculated for the comparison of the cell pairs. The Euclidean distances were based on the comparison of the cells based on the 290 genes that were differentially expressed among the cell types. The Euclidean distance is inversely proportional to similarity between the expression of the 290 genes. The Euclidean distance was calculated for the cell types using these 290 genes expressed differentially between the cell types. Similarity between the cells is inversely proportional to the Euclidean distance.

TABLE 7-2

The Euclidean Distances for the Cell Pairs.

| Cell Pair | Euclidean Distance |
|---|---|
| ICBM-hMSC | 24.71 |
| Placenta-umbilical | 25.52 |
| ICBM-Fibroblast | 36.44 |
| ICBM-placenta | 37.09 |
| Fibroblast-MSC | 39.63 |
| ICBM-Umbilical | 40.15 |
| Fibroblast-Umbilical | 41.59 |
| MSC-Placenta | 42.84 |
| MSC-Umbilical | 46.86 |
| ICBM-placenta | 48.41 |

Tables 7-3, 7-4, and 7-5 show the expression of genes increased in placenta-derived cells (Table 7-3), increased in umbilical cord-derived cells (Table 7-4), and reduced in umbilical cord and placenta-derived cells (Table 7-5).

TABLE 7-3

Genes which are specifically increased in expression in the placenta-derived cells as compared to the other cell lines assayed.

| Probe Set ID | Gene Name | NCBI Accession # |
|---|---|---|
| 209732_at | C-type (calcium dependent, carbohydrate-recognition domain) lectin, superfamily member 2 (activation-induced) | AF070642 |
| 206067_s_at | Wilms tumor 1 | NM_024426 |
| 207016_s_at | aldehyde dehydrogenase 1 family, member A2 | AB015228 |
| 206367_at | Renin | NM_000537 |
| 210004_at | oxidized low density lipoprotein (lectin-like) receptor 1 | AF035776 |
| 214993_at | Homo sapiens, clone IMAGE: 4179671, mRNA, partial cds | AF070642 |
| 202178_at | protein kinase C, zeta | NM_002744 |
| 209780_at | hypothetical protein DKFZp564F013 | AL136883 |
| 204135_at | downregulated in ovarian cancer 1 | NM_014890 |
| 213542_at | Homo sapiens mRNA; cDNA DKFZp547K1113 (from clone DKFZp547K1113) | AI246730 |

TABLE 7-4

Genes which are specifically increased in expression in umbilical cord-derived cells as compared to the other cell lines assayed.

| Probe Set ID | Gene Name | NCBI Accession # |
|---|---|---|
| 202859_x_at | Interleukin 8 | NM_000584 |
| 211506_s_at | Interleukin 8 | AF043337 |
| 210222_s_at | reticulon 1 | BC000314 |
| 204470_at | chemokine (C-X-C motif) ligand 1 (melanoma growth stimulating activity | NM_001511 |

TABLE 7-4-continued

Genes which are specifically increased in expression in umbilical cord-derived cells as compared to the other cell lines assayed.

| Probe Set ID | Gene Name | NCBI Accession # |
|---|---|---|
| 206336_at | chemokine (C-X-C motif) ligand 6 (granulocyte chemotactic protein 2) | NM_002993 |
| 207850_at | Chemokine (C-X-C motif) ligand 3 | NM_002090 |
| 203485_at | reticulon 1 | NM_021136 |
| 202644_s_at | tumor necrosis factor, alpha-induced protein 3 | NM_006290 |

TABLE 7-5

Genes which were decreased in expression in the umbilical cord and placenta cells as compared to the other cell lines assayed.

| Probe Set ID | Gene name | NCBI Accession # |
|---|---|---|
| 210135_s_at | short stature homeobox 2 | AF022654.1 |
| 205824_at | heat shock 27 kDa protein 2 | NM_001541.1 |
| 209687_at | chemokine (C-X-C motif) ligand 12 (stromal cell-derived factor 1) | U19495.1 |
| 203666_at | chemokine (C-X-C motif) ligand 12 (stromal cell-derived factor 1) | NM_000609.1 |
| 212670_at | elastin (supravalvular aortic stenosis, Williams-Beuren syndrome) | AA479278 |
| 213381_at | Homo sapiens mRNA; cDNA DKFZp586M2022 (from clone DKFZp586M2022) | N91149 |
| 206201_s_at | mesenchyme homeobox 2 (growth arrest-specific homeobox) | NM_005924.1 |
| 205817_at | Sine oculis homeobox homolog 1 (Drosophila) | NM_005982.1 |
| 209283_at | crystallin, alpha B | AF007162.1 |
| 212793_at | dishevelled associated activator of morphogenesis 2 | BF513244 |
| 213488_at | DKFZP586B2420 protein | AL050143.1 |
| 209763_at | similar to neuralin 1 | AL049176 |
| 205200_at | Tetranectin (plasminogen binding protein) | NM_003278.1 |
| 205743_at | src homology three (SH3) and cysteine rich domain | NM_003149.1 |
| 200921_s_at | B-cell translocation gene 1, anti-proliferative | NM_001731.1 |
| 206932_at | cholesterol 25-hydroxylase | NM_003956.1 |
| 204198_s_at | runt-related transcription factor 3 | AA541630 |
| 219747_at | hypothetical protein FLJ23191 | NM_024574.1 |
| 204773_at | Interleukin 11 receptor, alpha | NM_004512.1 |
| 202465_at | Procollagen C-endopeptidase enhancer | NM_002593.2 |
| 203706_s_at | Frizzled homolog 7 (Drosophila) | NM_003507.1 |
| 212736_at | hypothetical gene BC008967 | BE299456 |
| 214587_at | Collagen, type VIII, alpha 1 | BE877796 |
| 201645_at | Tenascin C (hexabrachion) | NM_002160.1 |
| 210239_at | iroquois homeobox protein 5 | U90304.1 |
| 203903_s_at | Hephaestin | NM_014799.1 |
| 205816_at | integrin, beta 8 | NM_002214.1 |
| 203069_at | synaptic vesicle glycoprotein 2 | NM_014849.1 |
| 213909_at | Homo sapiens cDNA FLJ12280 fis, clone MAMMA1001744 | AU147799 |
| 206315_at | cytokine receptor-like factor 1 | NM_004750.1 |
| 204401_at | potassium intermediate/small conductance calcium-activated channel, subfamily N, member 4 | NM_002250.1 |
| 216331_at | integrin, alpha 7 | AK022548.1 |
| 209663_s_at | integrin, alpha 7 | AF072132.1 |
| 213125_at | DKFZP586L151 protein | AW007573 |
| 202133_at | transcriptional co-activator with PDZ-binding motif (TAZ) | AA081084 |
| 206511_s_at | Sine oculis homeobox homolog 2 (Drosophila) | NM_016932.1 |
| 213435_at | KIAA1034 protein | AB028957.1 |
| 206115_at | early growth response 3 | NM_004430.1 |
| 213707_s_at | distal-less homeobox 5 | NM_005221.3 |
| 218181_s_at | hypothetical protein FLJ20373 | NM_017792.1 |
| 209160_at | aldo-keto reductase family 1, member C3 (3-alpha hydroxysteroid dehydrogenase, type II) | AB018580.1 |
| 213905_x_at | Biglycan | AA845258 |
| 201261_x_at | Biglycan | BC002416.1 |
| 202132_at | transcriptional co-activator with PDZ-binding motif (TAZ) | AA081084 |
| 214701_s_at | fibronectin 1 | AJ276395.1 |
| 213791_at | Proenkephalin | NM_006211.1 |
| 205422_s_at | Integrin, beta-like 1 (with EGF-like repeat domains) | NM_004791.1 |
| 214927_at | Homo sapiens mRNA full length insert cDNA clone EUROIMAGE 1968422 | AL359052.1 |
| 206070_s_at | EphA3 | AF213459.1 |
| 212805_at | KIAA0367 protein | AB002365.1 |
| 219789_at | natriuretic peptide receptor C/guanylate cyclase C (atrionatriuretic peptide receptor C) | AI628360 |

TABLE 7-5-continued

Genes which were decreased in expression in the umbilical cord and placenta cells as compared to the other cell lines assayed.

| Probe Set ID | Gene name | NCBI Accession # |
|---|---|---|
| 219054_at | hypothetical protein FLJ14054 | NM_024563.1 |
| 213429_at | *Homo sapiens* mRNA; cDNA DKEZp564B222 (from clone DKEZp564B222) | AW025579 |
| 204929_s_at | vesicle-associated membrane protein 5 (myobrevin) | NM_006634.1 |
| 201843_s_at | EGF-containing fibulin-like extracellular matrix protein 1 | NM_004105.2 |
| 221478_at | BCL2/adenovirus E1B 19 kDa interacting protein 3-like | AL132665.1 |
| 201792_at | AE binding protein 1 | NM_001129.2 |
| 204570_at | cytochrome c oxidase subunit VIIa polypeptide 1 (muscle) | NM_001864.1 |
| 201621_at | neuroblastoma, suppression of tumorigenicity 1 | NM_005380.1 |
| 202718_at | Insulin-like growth factor binding protein 2, 36 kDa | NM_000597.1 |

Tables 7-6, 7-7, and 7-8 show the expression of genes increased in human fibroblasts (Table 7-6), ICBM cells (Table 7-7), and MSCs (Table 7-8).

TABLE 7-6

Genes which were increased in expression in fibroblasts as compared to the other cell lines assayed.

dual specificity phosphatase 2
KIAA0527 protein
*Homo sapiens* cDNA: FLJ23224 fis, clone ADSU02206
dynein, cytoplasmic, intermediate polypeptide 1
ankyrin 3, node of Ranvier (ankyrin G)
inhibin, beta A (activin A, activin AB alpha polypeptide)
ectonucleotide pyrophosphatase/phosphodiesterase 4 (putative function)
KIAA1053 protein
microtubule-associated protein 1A
zinc finger protein 41
HSPC019 protein
*Homo sapiens* cDNA: FLJ23564 fis, clone LNG10773
*Homo sapiens* mRNA; cDNA DKFZp564A072 (from clone DKFZp564A072)
LIM protein (similar to rat protein kinase C-binding enigma)
inhibitor of kappa light polypeptide gene enhancer in B-cells, kinase complex-associated protein
hypothetical protein FLJ22004
Human (clone CTG-A4) mRNA sequence
ESTs, Moderately similar to cytokine receptor-like factor 2; cytokine receptor CRL2 precursor [*Homo sapiens*]
transforming growth factor, beta 2
hypothetical protein MGC29643
antigen identified by monoclonal antibody MRC OX-2
putative X-linked retinopathy protein

TABLE 7-7

Genes which were increased in expression in the ICBM-derived cells as compared to the other cell lines assayed.

cardiac ankyrin repeat protein
MHC class I region ORF
integrin, alpha 10
hypothetical protein FLJ22362
UDP-N-acetyl-alpha-D-galactosamine:polypeptide N-acetylgalactosaminyltransferase 3 (GalNAc-T3)
interferon-induced protein 44
SRY (sex determining region Y)-box 9 (campomelic dysplasia, autosomal sex-reversal)
keratin associated protein 1-1
hippocalcin-like 1
jagged 1 (Alagille syndrome)
proteoglycan 1, secretory granule

TABLE 7-8

Genes which were increased in expression in the MSC cells as compared to the other cell lines assayed.

interleukin 26
maltase-glucoamylase (α-glucosidase)
nuclear receptor subfamily 4, group A, member 2
v-fos FBJ murine osteosarcoma viral oncogene homolog
hypothetical protein DC42
nuclear receptor subfamily 4, group A, member 2
FBJ murine osteosarcoma viral oncogene homolog B
WNT1 inducible signaling pathway protein 1
MCF.2 cell line derived transforming sequence
potassium channel, subfamily K, member 15
cartilage paired-class homeoprotein 1
*Homo sapiens* cDNA FLJ12232 fis, clone MAMMA1001206
*Homo sapiens* cDNA FLJ34668 fis, clone LIVER2000775
jun B proto-oncogene
B-cell CLL/lymphoma 6 (zinc finger protein 51)
zinc finger protein 36, C3H type, homolog (mouse)

This example was performed to provide a molecular characterization of the cells derived from umbilical cord and placenta. This analysis included cells derived from three different umbilical cords and three different placentas. The study also included two different lines of dermal fibroblasts, three lines of mesenchymal stem cells, and three lines of iliac crest bone marrow cells. The mRNA that was expressed by these cells was analyzed on a GENECHIP oligonucleotide array that contained oligonucleotide probes for 22,000 genes.

The analysis revealed that transcripts for 290 genes were present in different amounts in these five different cell types. These genes include ten genes that are specifically increased in the placenta-derived cells and seven genes specifically increased in the umbilical cord-derived cells. Fifty-four genes were found to have specifically lower expression levels in placenta-derived and umbilical cord tissue-derived cells.

Example 8

Immunohistochemical Characterization of Cellular Phenotypes

The phenotypes of cells found within human umbilical cord tissue were analyzed by immunohistochemistry.

Human umbilical cord tissue was harvested and immersion fixed in 4% (w/v) paraformaldehyde overnight at 4° C. Immunohistochemistry was performed using antibodies directed against the following epitopes (see Table 8-1): vimentin (1:500; Sigma, St. Louis, Mo.), desmin (1:150, raised against rabbit; Sigma; or 1:300, raised against mouse;

Chemicon, Temecula, Calif.), alpha-smooth muscle actin (SMA; 1:400; Sigma), cytokeratin 18 (CK18; 1:400; Sigma), von Willebrand Factor (vWF; 1:200; Sigma), and CD34 (human CD34 Class III; 1:100; DAKOCytomation, Carpinteria, Calif.). In addition, the following markers were tested: anti-human GROalpha-PE (1:100; Becton Dickinson, Franklin Lakes, N.J.), anti-human GCP-2 (1:100; Santa Cruz Biotech, Santa Cruz, Calif.), anti-human oxidized LDL receptor 1 (ox-LDL R1; 1:100; Santa Cruz Biotech), and anti-human NOGO-A (1:100; Santa Cruz Biotech). Fixed specimens were trimmed with a scalpel and placed within OCT embedding compound (Tissue-Tek OCT; Sakura, Torrance, Calif.) on a dry ice bath containing ethanol. Frozen blocks were then sectioned (10 μm thick) using a standard cryostat (Leica Microsystems) and mounted onto glass slides for staining.

Immunohistochemistry was performed similar to previous studies. (E.g., Messina et al., *Exper. Neurol.*, 2003; 184: 816-829). Tissue sections were washed with phosphate-buffered saline (PBS) and exposed to a protein blocking solution containing PBS, 4% (v/v) goat serum (Chemicon, Temecula, Calif.), and 0.3% (v/v) Triton (Triton X-100; Sigma) for 1 hour to access intracellular antigens. In instances where the epitope of interest would be located on the cell surface (CD34, ox-LDL R1), triton was omitted in all steps of the procedure in order to prevent epitope loss. Furthermore, in instances where the primary antibody was raised against goat (GCP-2, ox-LDL R1, NOGO-A), 3% (v/v) donkey serum was used in place of goat serum throughout the procedure. Primary antibodies, diluted in blocking solution, were then applied to the sections for a period of 4 hours at room temperature. Primary antibody solutions were removed, and cultures washed with PBS prior to application of secondary antibody solutions (1 hour at room temperature) containing block along with goat anti-mouse IgG-Texas Red (1:250; Molecular Probes, Eugene, Oreg.) and/or goat anti-rabbit IgG-Alexa 488 (1:250; Molecular Probes) or donkey anti-goat IgG-FITC (1:150; Santa Cruz Biotech). Cultures were washed, and 10 micromolar DAPI (Molecular Probes) was applied for 10 minutes to visualize cell nuclei.

Following immune-staining, fluorescence was visualized using the appropriate fluorescence filter on an Olympus inverted epifluorescent microscope (Olympus, Melville, N.Y.). Positive staining was represented by fluorescence signal above control staining. Representative images were captured using a digital color video camera and ImagePro software (Media Cybernetics, Carlsbad, Calif.). For triple-stained samples, each image was taken using only one emission filter at a time. Layered montages were then prepared using Adobe Photoshop software (Adobe, San Jose, Calif.).

TABLE 8-1

Summary of Primary Antibodies Used

| Antibody | Concentration | Vendor |
|---|---|---|
| Vimentin | 1:500 | Sigma, St. Louis, MO |
| Desmin (rb) | 1:150 | Sigma |
| Desmin (m) | 1:300 | Chemicon, Temecula, CA |
| alpha-smooth muscle actin (SMA) | 1:400 | Sigma |
| Cytokeratin 18 (CK18) | 1:400 | Sigma |
| von Willebrand factor (vWF) | 1:200 | Sigma |
| CD34 III | 1:100 | DakoCytomation, Carpinteria, CA |

TABLE 8-1-continued

Summary of Primary Antibodies Used

| Antibody | Concentration | Vendor |
|---|---|---|
| GROalpha-PE | 1:100 | BD, Franklin Lakes, NJ |
| GCP-2 | 1:100 | Santa Cruz Biotech |
| Ox-LDL R1 | 1:100 | Santa Cruz Biotech |
| NOGO-A | 1:100 | Santa Cruz Biotech |

Vimentin, desmin, SMA, CK18, vWF, and CD34 markers were expressed in a subset of the cells found within umbilical cord (data not shown). In particular, vWF and CD34 expression were restricted to blood vessels contained within the cord. CD34+ cells were on the innermost layer (lumen side). Vimentin expression was found throughout the matrix and blood vessels of the cord. SMA was limited to the matrix and outer walls of the artery and vein, but not contained within the vessels themselves. CK18 and desmin were observed within the vessels only, desmin being restricted to the middle and outer layers.

None of these markers were observed within umbilical cord (data not shown).

Vimentin, desmin, alpha-smooth muscle actin, cytokeratin 18, von Willebrand Factor, and CD 34 are expressed in cells within human umbilical cord. Based on in vitro characterization studies showing that only vimentin and alpha-smooth muscle actin are expressed, the data suggests that the current process of umbilical cord-derived cell isolation harvests a subpopulation of cells or that the cells isolated change expression of markers to express vimentin and alpha-smooth muscle actin.

Example 9

Secretion of Trophic Factors

The secretion of selected trophic factors from UTC was measured. Factors were selected that have angiogenic activity e.g., hepatocyte growth factor (HGF) (Rosen et al., *Ciba Found. Symp.*, 1997; 212:215-26); monocyte chemotactic protein 1 (MCP-1) (Salcedo et al., *Blood*, 2000; 96; 34-40); interleukin-8 (IL-8) (Li et al., *J. Immunol.*, 2003; 170:3369-76); keratinocyte growth factor (KGF); basic fibroblast growth factor (bFGF); vascular endothelial growth factor (VEGF) (Hughes et al., *Ann. Thorac. Surg.* 2004; 77:812-8); tissue inhibitor of matrix metalloproteinase 1 (TIMP1); angiopoietin 2 (ANG2); platelet derived growth factor (PDGFbb); thrombopoietin (TPO); heparin-binding epidermal growth factor (HB-EGF); stromal-derived factor 1alpha (SDF-1alpha), neurotrophic/neuroprotective activity (brain-derived neurotrophic factor (BDNF) (Cheng et al., *Dev. Biol.*, 2003; 258; 319-33); interleukin-6 (IL-6); granulocyte chemotactic protein-2 (GCP-2); transforming growth factor beta2 (TGFbeta2)); or chemokine activity (macrophage inflammatory protein 1alpha (MIP1alpha); macrophage inflammatory protein 1 beta (MIP1beta); monocyte chemoattractant-1 (MCP-1); Rantes (regulated on activation, normal T cell expressed and secreted); 1309; thymus and activation-regulated chemokine (TARC); Eotaxin; macrophage-derived chemokine (MDC); and (IL-8).

Cells derived from umbilical cord, as well as human fibroblasts derived from human neonatal foreskin, were cultured in growth medium on gelatin-coated T75 flasks. Cells were cryopreserved at passage 11 and stored in liquid nitrogen. After thawing, growth medium was added to the cells, followed by transfer to a 15 ml centrifuge tube and centrifugation of the cells at 150×g for 5 minutes. The cell pellet was resuspended in 4 ml growth medium, and the cells were counted. Cells were seeded at 5,000 cells/cm$^2$ in T75 flasks each containing 15 ml of growth medium, and cultured for 24 hours. The medium was changed to a serum-free medium (DMEM-low glucose (Gibco), 0.1% (w/v) bovine serum albumin (Sigma), penicillin (50 U/ml) and streptomycin (50 μg/ml, Gibco)) for 8 hours. Conditioned serum-free medium was collected at the end of incubation by centrifugation at 14,000×g for 5 minutes and stored at −20° C.

To estimate the number of cells in each flask, the cells were washed with phosphate-buffered saline (PBS) and detached using 2 ml trypsin/EDTA (Gibco). Trypsin activity was inhibited by addition of 8 ml growth medium. The cells were centrifuged at 150×g for 5 minutes. The supernatant was removed, and the cells were resuspended in 1 ml Growth Medium. The cell number was estimated with a hemocytometer.

Cells were grown at 37° C. in 5% $CO_2$ and atmospheric oxygen. The amount of MCP-1, IL-6, VEGF, SDF-1alpha, GCP-2, IL-8, and TGF-beta2 produced by each cell sample was determined by ELISA (R&D Systems, Minneapolis, Mn.). All assays were performed according to the manufacturer's instructions. Values presented are picograms per ml per million cells (n=2, sem).

Chemokines (MIP1 alpha, MIP1beta, MCP-1, Rantes, 1309, TARC, Eotaxin, MDC, IL8), BDNF, and angiogenic factors (HGF, KGF, bFGF, VEGF, TIMP1, ANG2, PDGFbb, TPO, HB-EGF were measured using SearchLight Proteome Arrays (Pierce Biotechnology Inc.). The Proteome Arrays are multiplexed sandwich ELISAs for the quantitative measurement of two to sixteen proteins per well. The arrays are produced by spotting a 2×2, 3×3, or 4×4 pattern of four to sixteen different capture antibodies into each well of a 96-well plate. Following a sandwich ELISA procedure, the entire plate is imaged to capture the chemiluminescent signal generated at each spot within each well of the plate. The signal generated at each spot is proportional to the amount of target protein in the original standard or sample.

MCP-1 and IL-6 were secreted by umbilicus-derived PPDCs and dermal fibroblasts (Table 9-1). SDF-1alpha and GCP-2 were secreted by fibroblasts. GCP-2 and IL-8 were secreted by umbilicus-derived PPDCs. TGF-beta2 was not detected from either cell type by ELISA.

TABLE 9-1

ELISA Results: Detection of Trophic Factors

|  | MCP-1 | IL-6 | VEGF | SDF-1α | GCP-2 | IL-8 | TGF-beta2 |
|---|---|---|---|---|---|---|---|
| Fibroblast | 17 ± 1 | 61 ± 3 | 29 ± 2 | 19 ± 1 | 21 ± 1 | ND | ND |
| Umbilical (022803) | 1150 ± 74 | 4234 ± 289 | ND | ND | 160 ± 11 | 2058 ± 145 | ND |
| Umbilical (071003) | 2794 ± 84 | 1356 ± 43 | ND | ND | 2184 ± 98 | 2369 ± 23 | ND |

Key:
ND: Not Detected.,
=/− sem

Searchlight™ Multiplexed ELISA assay. TIMP1, TPO, KGF, HGF, FGF, HBEGF, BDNF, MIP1beta, MCP1, RANTES, 1309, TARC, MDC, and IL-8 were secreted from umbilicus-derived PPDCs (Tables 9-2 and 9-3). No Ang2, VEGF, or PDGFbb were detected.

TABLE 9-2

Searchlight ™ Multiplexed ELISA assay results

|  | TIMP1 | ANG2 | PDGFbb | TPO | KGF | HGF | FGF | VEGF | HBEGF | BDNF |
|---|---|---|---|---|---|---|---|---|---|---|
| hFB | 19306.3 | ND | ND | 230.5 | 5.0 | ND | ND | 27.9 | 1.3 | ND |
| U1 | 57718.4 | ND | ND | 1240.0 | 5.8 | 559.3 | 148.7 | ND | 9.3 | 165.7 |
| U3 | 21850.0 | ND | ND | 1134.5 | 9.0 | 195.6 | 30.8 | ND | 5.4 | 388.6 |

Key:
hFB (human fibroblasts),
U1 (umbilicus-derived PPDC (022803)),
U3 (umbilicus-derived PPDC (071003)),
ND: Not Detected.

TABLE 9-3

Searchlight™ Multiplexed ELISA assay results

|     | MIP1a | MIP1b | MCP1   | RANTES | I309 | TARC | Eotaxin | MDC  | IL8     |
| --- | ----- | ----- | ------ | ------ | ---- | ---- | ------- | ---- | ------- |
| hFB | ND    | ND    | 39.6   | ND     | ND   | 0.1  | ND      | ND   | 204.9   |
| U1  | ND    | 8.0   | 1694.2 | ND     | 22.4 | 37.6 | ND      | 18.9 | 51930.1 |
| U3  | ND    | 5.2   | 2018.7 | 41.5   | 11.6 | 21.4 | ND      | 4.8  | 10515.9 |

Key:
hFB (human fibroblasts),
U1 (umbilicus-derived PPDC (022803)),
U3 (umbilicus-derived PPDC (071003)),
ND: Not Detected Umbilicus-derived cells secreted a number of trophic factors. Some of these trophic factors, such as HGF, bFGF, MCP-1 and IL-8, play important roles in angiogenesis. Other trophic factors, such as BDNF and IL-6, have important roles in neural regeneration or protection.

Example 10

Assay for Telomerase Activity

Telomerase functions to synthesize telomere repeats that serve to protect the integrity of chromosomes and to prolong the replicative life span of cells (Liu, K, et al., *PNAS,* 1999; 96:5147-5152). Telomerase consists of two components, telomerase RNA template (hTER) and telomerase reverse transcriptase (hTERT). Regulation of telomerase is determined by transcription of hTERT but not hTER. Real-time polymerase chain reaction (PCR) for hTERT mRNA thus is an accepted method for determining telomerase activity of cells.

Cell Isolation

Real-time PCR experiments were performed to determine telomerase production of human umbilical cord tissue-derived cells. Human umbilical cord tissue-derived cells were prepared in accordance with the above Examples and the examples set forth in U.S. Pat. No. 7,510,873. Generally, umbilical cords obtained from National Disease Research Interchange (Philadelphia, Pa.) following a normal delivery were washed to remove blood and debris and mechanically dissociated. The tissue was then incubated with digestion enzymes including collagenase, dispase, and hyaluronidase in culture medium at 37° C. Human umbilical cord tissue-derived cells were cultured according to the methods set forth in the examples of the '012 application. Mesenchymal stem cells and normal dermal skin fibroblasts (cc-2509 lot #9F0844) were obtained from Cambrex, Walkersville, Md. A pluripotent human testicular embryonal carcinoma (teratoma) cell line nTera-2 cells (NTERA-2 cl.D1) (See, Plaia et al., *Stem Cells,* 2006; 24(3):531-546) was purchased from ATCC (Manassas, Va.) and was cultured according to the methods set forth in U.S. Pat. No. 7,510,873.

Total RNA Isolation

RNA was extracted from the cells using RNeasy® kit (Qiagen, Valencia, Ca.). RNA was eluted with 50 µl DEPC-treated water and stored at −80° C. RNA was reverse transcribed using random hexamers with the TaqMan® reverse transcription reagents (Applied Biosystems, Foster City, Calif.) at 25° C. for 10 minutes, 37° C. for 60 minutes and 95° C. for 10 minutes. Samples were stored at −20° C.

Real-Time PCR

PCR was performed on cDNA samples using the Applied Biosystems Assays-On-Demand™ (also known as Taq-Man® Gene Expression Assays) according to the manufacturer's specifications (Applied Biosystems). This commercial kit is widely used to assay for telomerase in human cells. Briefly, hTert (human telomerase gene) (Hs00162669) and human GAPDH (an internal control) were mixed with cDNA and TaqMan® Universal PCR master mix using a 7000 sequence detection system with ABI prism 7000 SDS software (Applied Biosystems). Thermal cycle conditions were initially 50° C. for 2 minutes and 95° C. for 10 minutes followed by 40 cycles of 95° C. for 15 seconds and 60° C. for 1 minute. PCR data was analyzed according to the manufacturer's specifications.

Human umbilical cord tissue-derived cells (ATCC Accession No. PTA-6067), fibroblasts, and mesenchymal stem cells were assayed for hTert and 18S RNA. As shown in Table 10-1, hTert, and hence telomerase, was not detected in human umbilical cord tissue-derived cells.

TABLE 10-1

|                          | hTert | 18S RNA |
| ------------------------ | ----- | ------- |
| Umbilical cells (022803) | ND    | +       |
| Fibroblasts              | ND    | +       |

ND- not detected;
+ signal detected

Human umbilical cord tissue-derived cells (isolate 022803, ATCC Accession No. PTA-6067) and nTera-2 cells were assayed and the results showed no expression of the telomerase in two lots of human umbilical cord tissue-derived cells while the teratoma cell line revealed high level of expression (Table 10-2).

TABLE 10-2

|           | hTert  |        | GAPDH  | hTert norm |        |
| --------- | ------ | ------ | ------ | ---------- | ------ |
| Cell type | Exp. 1 | Exp. 2 | Exp. 1 | Exp. 2     |        |
| nTera2    | 25.85  | 27.31  | 16.41  | 16.31      | 0.61   |
| 022803    | —      | —      | 22.97  | 22.79      | —      |

Therefore, it can be concluded that the human umbilical tissue-derived cells of the present invention do not express telomerase.

While the invention has been described and illustrated herein by references to various specific materials, procedures and examples, it is understood that the invention is not restricted to the particular combinations of material and procedures selected for that purpose. Numerous variations of such details can be implied as will be appreciated by those skilled in the art. It is intended that the specification and examples be considered as exemplary, only, with the true scope and spirit of the invention being indicated by the following claims. All references, patents, and patent applications referred to in this application are herein incorporated by reference in their entirety.

What is claimed is:

1. A composition comprising umbilical cord tissue-derived cells and a cryopreservation medium, wherein said cryopreservation medium comprises:
   the amino acids L-Arginine, L-Glutamine, Glycine, L-Isoleucine, L-Leucine, L-Lysine HCl, L-Methionine, L-Phenylalanine, L-Serine, L-Threonine, L-Tryptophan, and L-Valine;
   the vitamins D-calcium pantothenate, choline chloride, folic acid, niacinamide, pyridoxine HCl, riboflavin and thiamine HCl;
   the inorganic salts potassium chloride, sodium bicarbonate, sodium chloride, and sodium phosphate monobasic $H_2O$;
   the inorganic salts calcium chloride dihydrate, magnesium chloride, potassium bicarbonate, and potassium monophosphate; and
   lactobionic acid, glutathione, dextrose, sucrose, mannitol, and from about 5 to about 10% v/v of DMSO,
   wherein the composition lacks serum, and
   wherein the composition comprises about 3.2 mg/L of calcium chloride dihydrate, about 458 mg/L of magnesium chloride, about 225 mg/L of potassium bicarbonate, and about 612 mg/L of potassium monophosphate.

2. The composition of claim 1, wherein the cryopreservation medium comprises:
   at least about 37.8 mg/L of L-Arginine, at least about 262.8 mg/L of L-Glutamine, at least about 13.5 mg/L of L-Glycine, at least about 47.16 mg/L of L-Isoleucine, at least about 47.16 mg/L of L-Leucine, at least about 65.79 mg/L of L-Lysine HCl, at least about 13.5 mg/L of L-Methionine, at least about 29.7 mg/L of L-Phenylalanine, at least about 18.9 mg/L of L-Serine, at least about 42.75 5 mg/L of L-Threonine, at least about 7.2 mg/L of L-Tryptophan, and 41.85 mg/L of L-Valine;
   at least about 0.18 mg/L of riboflavin and at least about 1.8 mg/L of each of the vitamins, D-calcium pantothenate, choline chloride, folic acid, niacinamide, pyridoxine HCl, and thiamine;
   at least about 432 mg/L of potassium chloride, about 2565 mg/L of sodium bicarbonate, about 2880 of sodium chloride, at least about 56.25 mg/L of sodium phosphate monobasic $H_2O$, about 3.2 mg/L of calcium chloride dihydrate, about 458 mg/L of magnesium chloride, about 225 mg/L, of potassium bicarbonate, and about 612 mg/L of potassium monophosphate; and
   from about 5 to about 10% v/v of DMSO, at least about 855 mg/L of dextrose, at least about 415 mg/L of glutathione; at least about 3081 mg/L sucrose and at least about 1639 mg/L of mannitol.

3. The composition of claim 1, wherein the umbilical cord tissue-derived cells are isolated from human umbilical cord tissue substantially free of blood, are capable of self-renewal and expansion in culture, have the potential to differentiate, lack the production of CD117 and CD45, and do not express hTERT or telomerase.

4. The composition of claim 3, wherein the umbilical cord tissue-derived cells further comprise one or more of the following characteristics:
   express oxidized low density lipoprotein receptor 1, reticulon, chemokine receptor ligand 3, and/or granulocyte chemotactic protein;
   do not express CD31 or CD34; and
   express CD10, CD13, CD44, CD73, and CD90.

5. A kit comprising the composition of claim 1, wherein the umbilical cord tissue-derived cells are isolated from human umbilical cord tissue substantially free of blood, are capable of self-renewal and expansion in culture, have the potential to differentiate, lack the production of CD117 and CD45, and do not express hTERT or telomerase.

6. The composition of claim 1, wherein the cryopreservation medium comprises from about 5 to about 10% v/v of DMSO, from about 12,000 to about 20,000 mg/L of lactobionic acid, from about 329 to about 495 mg/L of glutathione, dextrose, from about 2460 to about 3695 mg/L of sucrose, and from about 1310 to about 1967 mg/L of mannitol.

7. The composition of claim 1, wherein the composition prevents cellular swelling, controls free radical accumulation, and maintains acidosis.

8. A method of cryopreserving human umbilical cord tissue-derived cells comprising:
   providing a formulation comprising the composition for cryopreservation of claim 1 and umbilical cord tissue-derived cells;
   cooling the cryopreservation composition from a starting temperature of about 4° C. at a rate of −1.0° C./min until the composition achieves a temperature of about −45.0° C.; and
   further cooling the cryopreservation composition until the composition achieves a storage temperature of about −120.0° C.;
   wherein the umbilical cord tissue-derived cells are isolated from human umbilical cord tissue substantially free of blood, are capable of self-renewal and expansion in culture, have the potential to differentiate, lack the production of CD117 and CD45, and do not express hTERT or telomerase.

9. The method of claim 8, wherein the method further comprises cooling the cryopreservation composition to a starting temperature of about 4° C. and/or maintaining the starting temperature of about 4° C. for about 15 minutes.

10. A method of cryopreserving human umbilical cord tissue-derived cells comprising:
    providing a formulation comprising the composition for cryopreservation of claim 2 and umbilical cord tissue-derived cells;
    cooling the cryopreservation composition from a starting temperature of about 4° C. at a rate of −1.0° C./min until the composition achieves a temperature of about −45.0° C.; and
    further cooling the cryopreservation composition until the composition achieves a storage temperature of about −120.0° C.;
    wherein the umbilical cord tissue-derived cells are isolated from human umbilical cord tissue substantially free of blood, are capable of self-renewal and expansion in culture, have the potential to differentiate, lack the production of CD117 or CD45, and do not express hTERT or telomerase.

11. The method of claim 10, wherein the umbilical cord tissue-derived cells further comprise one or more of the following characteristics:

express oxidized low density lipoprotein receptor 1, reticulon, chemokine receptor ligand 3, and/or granulocyte chemotactic protein;
do not express CD31 or CD34;
express, relative to a human fibroblast, mesenchymal stem cell, or iliac crest bone marrow cell, increased levels of interleukin 8 or reticulon 1; and
express CD10, CD13, CD44, CD73, and CD90.

* * * * *